(12) United States Patent
Faumas et al.

(10) Patent No.: US 11,460,152 B2
(45) Date of Patent: Oct. 4, 2022

(54) STEAM TRAP AND VALVE ASSEMBLY STATION

(71) Applicant: ARMSTRONG INTERNATIONAL, INC., Three Rivers, MI (US)

(72) Inventors: Jean-Marie Faumas, Liège (BE); Augustin Graide, Marche-en-Famenne (BE)

(73) Assignee: ARMSTRONG INTERNATIONAL, INC., Three Rivers, MI (US)

( * ) Notice: Subject to any disclaimer, the term of this patent is extended or adjusted under 35 U.S.C. 154(b) by 0 days.

(21) Appl. No.: 17/107,130

(22) Filed: Nov. 30, 2020

(65) Prior Publication Data

US 2021/0172566 A1 Jun. 10, 2021

Related U.S. Application Data

(60) Provisional application No. 63/066,879, filed on Aug. 18, 2020, provisional application No. 62/945,958, filed on Dec. 10, 2019.

(51) Int. Cl.
  *F16T 1/38* (2006.01)
  *F16K 11/07* (2006.01)
  *F16T 1/02* (2006.01)
(52) U.S. Cl.
  CPC ............... *F16T 1/383* (2013.01); *F16T 1/02* (2013.01)
(58) Field of Classification Search
  CPC ..... F16T 1/02; F16T 1/38; F16T 1/383; F16K 11/07
  (Continued)

(56) References Cited

U.S. PATENT DOCUMENTS 2,542,390 A * 2/1951 Brown ................ F16K 11/0712
                                              137/625.48
3,951,381 A * 4/1976 Whitener ............ F16K 11/0712
                                              251/356
(Continued)

FOREIGN PATENT DOCUMENTS

DE     102006041132 A1   3/2008
EP        3205923 A1     8/2017
(Continued)

OTHER PUBLICATIONS

Extended European Search Report of European application No. 20212465.7 dated May 10, 2021, 6 pages.

*Primary Examiner* — Paul J Gray
(74) *Attorney, Agent, or Firm* — Brooks Kushman P.C.

(57) ABSTRACT

A manifold for a steam system is provided with a body forming a first chamber extending between an inlet and an outlet along a first axis and a second chamber extending from a face of the body along a second axis to intersect the first chamber. A first piston valve sub-assembly is disposed in the second chamber to enable and disable steam communication between the second chamber and a first port. A second piston valve sub-assembly is disposed in the second chamber to enable and disable steam communication between the second chamber and a second port. A handle is mounted for rotation relative to the face. A valve stem is connected to the handle and mounted for translation within the second chamber in response to rotation of the handle between four positions to individually activate and deactivate the first piston valve sub-assembly and the second piston valve sub-assembly.

16 Claims, 15 Drawing Sheets

(58) Field of Classification Search
USPC .................................. 137/556, 625.48–625.5
See application file for complete search history.

(56) References Cited

U.S. PATENT DOCUMENTS

| | | | |
|---|---|---|---|
| 4,149,557 | A | 4/1979 | Keech et al. |
| 4,508,135 | A | 4/1985 | Schlesch et al. |
| 5,881,766 | A | 3/1999 | Schlesch et al. |
| 5,947,145 | A | 9/1999 | Schlesch et al. |
| 6,145,529 | A | 11/2000 | Hellman et al. |
| 6,467,503 | B2 | 10/2002 | Schlesch et al. |
| 6,485,537 | B2 | 11/2002 | Brilmaker |
| 8,800,597 | B2 * | 8/2014 | Colby ................ F16K 1/04 137/556 |
| 8,935,126 | B2 | 1/2015 | Armstrong et al. |

FOREIGN PATENT DOCUMENTS

| | | | |
|---|---|---|---|
| FR | 2613806 | A1 | 10/1988 |
| FR | 2631095 | A1 | 11/1989 |
| FR | 2653520 | A2 | 4/1991 |

\* cited by examiner

STEAM TRAP AND VALVE ASSEMBLY STATION

CROSS-REFERENCE TO RELATED APPLICATIONS

This application claims the benefit of U.S. provisional application Ser. No. 62/945,958 filed Dec. 10, 2019, and U.S. provisional application Ser. No. 63/066,879 filed Aug. 18, 2020, the disclosures of which are hereby incorporated in their entirety by reference herein.

TECHNICAL FIELD

One or more embodiments relate to a steam trap and valve assembly station for a steam system.

BACKGROUND

Steam is an efficient and controllable heat transfer medium that is often used by a heat distribution system for transporting energy from a central steam source to other locations in a plant to heat air, water, or process applications. Condensate is a liquid by-product of heat transfer that forms in such a steam-based heat distribution system or "steam system." Condensate that collects in the steam system reduces the efficiency of the heat transfer. Other items that may accumulate in a steam system that create barriers to heat transfer include non-condensable gases (e.g., air and carbon dioxide), dirt, scale, and metal particles.

Steam systems may include one or more steam traps to separate condensate and non-condensable gases from the steam. The steam traps return condensate to the steam source for reuse and evacuate the non-condensable gases out of the steam system. Steam traps are often located at natural low points or ahead of control valves. Steam systems typically include isolation valves located upstream and downstream of the steam trap. These isolation valves may be closed to shut-off steam flow to allow for maintenance or replacement of the steam trap.

SUMMARY

In one embodiment, a station for a steam system includes a manifold body with two upper faces, an inlet, and an outlet, wherein the manifold body defines a fluid passage between the inlet and the outlet. A steam trap is connectable to the fluid passage between the inlet and the outlet. An inlet valve stem is mounted for rotation relative to one of the two upper faces and extends into the fluid passage between the inlet and the steam trap. Two inlet flow collars are mounted to the inlet valve stem and coaxially aligned with, and spaced apart from, each other. An inlet handle is secured to the valve stem and is adapted to facilitate manual rotation of the inlet valve stem and two inlet flow collars between an open position to facilitate fluid flow to the steam trap and a closed position to block fluid flow to the steam trap.

In another embodiment a manifold for a steam system is provided with a body that forms a first chamber extending between an inlet and an outlet and a second chamber extending from a face to intersect the first chamber. A first piston valve sub-assembly is disposed in the second chamber to enable/disable steam communication between the second chamber and a first tracer line. A second piston valve sub-assembly is disposed in the second chamber to enable/disable steam communication between the second chamber and a second tracer line. A single handle is mounted for rotation relative to the face. A single valve piston stem is connected to the handle and mounted for translation within the second chamber in response to rotation of the handle between four positions to individually activate/deactivate the first piston valve sub-assembly and the second piston valve sub-assembly.

In one embodiment, a manifold for a steam system is provided with a body forming a first chamber extending between an inlet and an outlet, and a second chamber extending inward from a face of the body to intersect the first chamber, the body further forming a first passage extending from an intermediate region of the second chamber to a first port and a second passage extending from a distal region of the second chamber to a second port. A first gasket is disposed in the intermediate region of the second chamber. A second gasket is disposed in the distal region of the second chamber. A valve stem is mounted for translation within the second chamber between four positions to individually activate and deactivate the first port and the second port. The valve stem includes: a central piston sized to engage the first gasket to block steam flow to the first port, and a distal piston longitudinally spaced apart from the central piston by a shaft portion and sized to engage the second gasket to block steam flow to the second port.

In another embodiment a manifold for a steam system is provided with a body forming a first chamber extending between an inlet and an outlet along a first axis and a second chamber extending from a face of the body along a second axis to intersect the first chamber. A first piston valve sub-assembly is disposed in the second chamber to enable and disable steam communication between the second chamber and a first port. A second piston valve sub-assembly is disposed in the second chamber, and spaced apart from the first piston valve sub-assembly, to enable and disable steam communication between the second chamber and a second port. A handle is mounted for rotation relative to the face. A valve stem is connected to the handle and mounted for translation within the second chamber in response to rotation of the handle between four positions to individually activate and deactivate the first piston valve sub-assembly and the second piston valve sub-assembly.

In yet another embodiment, a station for a steam system is provided with a body forming a first chamber extending between an inlet and an outlet along a first axis and forming an inlet valve chamber extending from a face of the body to intersect the first chamber, wherein the inlet is adapted to receive a mixture of steam and condensate. A first piston valve sub-assembly is disposed in the inlet valve chamber to enable and disable steam communication between the inlet valve chamber and a first port. A second piston valve sub-assembly disposed in the inlet valve chamber to enable and disable steam communication between the inlet valve chamber and a second port. A handle is mounted for rotation relative to the face. A valve stem is connected to the handle and mounted for translation within the inlet valve chamber in response to rotation of the handle between four positions to individually activate and deactivate the first piston valve sub-assembly and the second piston valve sub-assembly. A steam trap is coupled to the second port to separate condensate from the mixture of steam and condensate.

In still yet another embodiment, a method is provided for controlling a steam manifold. A body is provided with a first chamber extending between an inlet and an outlet, a second chamber intersecting the first chamber, and a first port and a second port both connected to the second chamber. A first gasket is arranged in an intermediate region of the second chamber between an intersection with the first chamber and the first port. A second gasket is arranged in a distal region of the second chamber between an intersection with the first chamber and the second port. A valve stem with a central piston spaced apart from a distal piston by a shaft portion is inserted into the second chamber. An input to the valve stem is rotated relative to the body to translate the valve stem within the second chamber to engage and disengage the first gasket and the second gasket to individually activate and deactivate the first port and the second port.

DETAILED DESCRIPTION

As required, detailed embodiments of the present invention are disclosed herein; however, it is to be understood that the disclosed embodiments are merely exemplary of the invention that may be embodied in various and alternative forms. For example, the manifold design is described in detail herein with reference to a "steam distribution" embodiment, however other embodiments of the manifold design are applicable to other forms and applications, such as a "condensate collection" application, by adding one or more steam traps and/or trap valve stations between the manifold and tracer lines. Alternative single valve stem piston assembly shape and design allows for a different sequence of operations than the one described in detail in this application. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
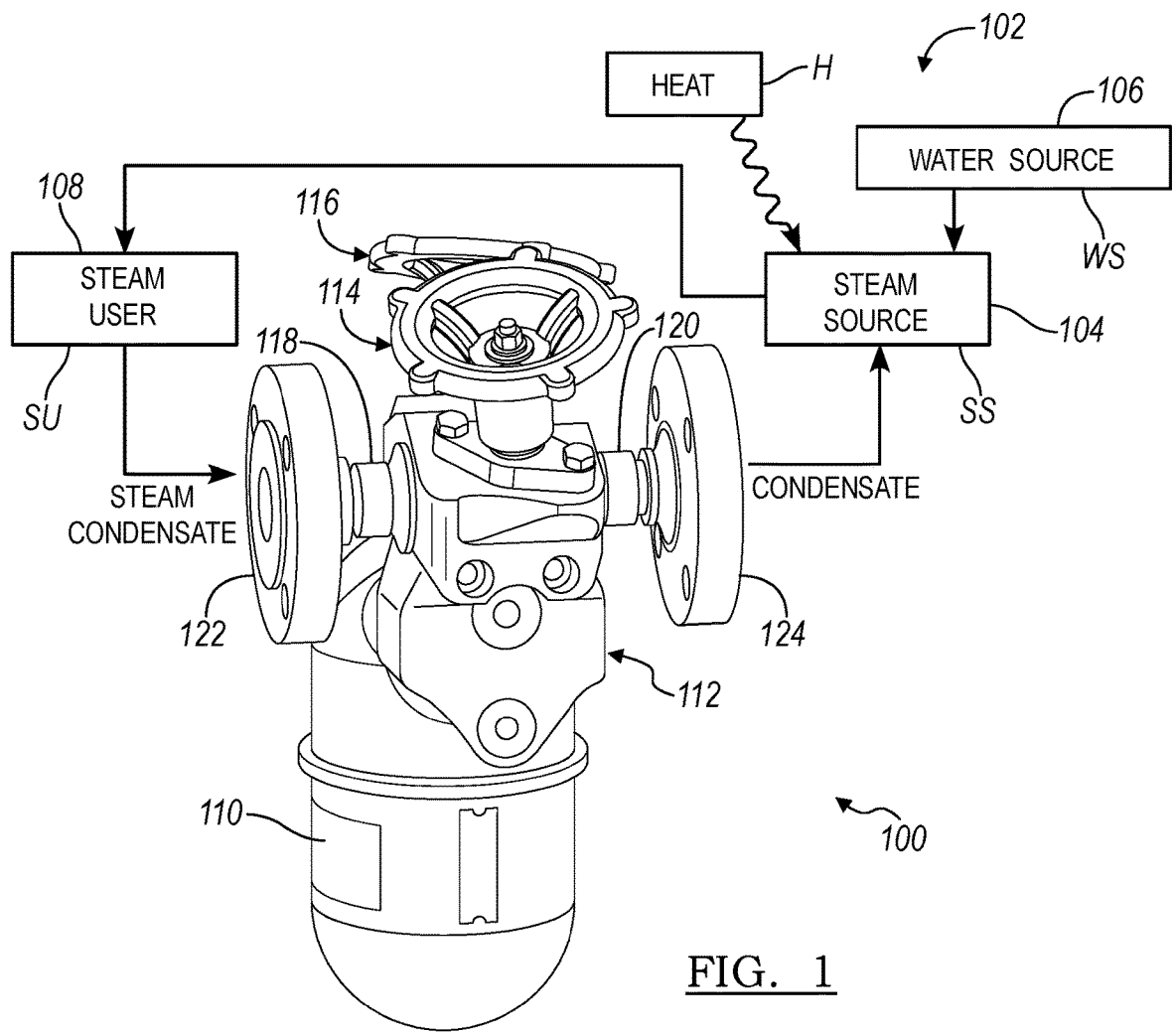
FIG. 1 is a schematic view of a steam system with a steam trap and valve assembly station according to one or more embodiments.

With reference to FIG. 1, a steam trap and valve assembly station is illustrated in accordance with one or more embodiments and generally represented by numeral 100. The station 100 is illustrated as part of a steam system 102. The steam system 102 includes a steam source 104, such as a boiler, that receives water from a water source 106. The steam source 104 heats the water to generate steam, and provides the steam to a steam user 108, such as a radiator, along a steam line. The steam user 108 uses the steam to heat its environment, then provides the remaining steam/condensate mixture to the station 100. The station 100 includes a steam trap 110 that separates the condensate from the steam and returns the condensate to the steam source 104 along a drain line.

The station 100 includes a manifold 112 that defines multiple fluid passages and supports an inlet valve assembly 114 and an outlet valve assembly 116. The valve assemblies 114, 116 are normally open to allow fluid to flow through the station 100 and may be closed to isolate the steam trap 110 from the fluid within the steam system 102 for maintenance or replacement of the steam trap 110. Each valve assembly 114, 116 includes two valves that are aligned along a common axis to provide double isolation both upstream and downstream of the steam trap 110 while maintaining a compact overall width of the station 100.

The station 100 includes an inlet port 118 for receiving the steam/condensate mixture and an outlet port 120 through which the condensate exits the station 100. The station 100 includes an inlet flange 122 to connect the inlet port 118 to a corresponding inlet fitting (not shown) of the steam system 102. The station 100 also includes an outlet flange 124 to connect the outlet port 120 to a corresponding outlet fitting (not shown) of the steam system 102.

The flanges 122, 124 may be replaced by alternate flanges (not shown) to accommodate multiple inlet/outlet fittings. For example, the flanges 122, 124 may be connectable to the ports 118, 120 by a threaded interface, e.g., each flange includes external threads to engage internal threads of the corresponding port. Additionally, each flange 122, 124 includes a hole pattern for connecting to a corresponding fitting. The station 100 may accommodate steam systems 102 with different fittings and hole patterns using mating flanges. The station 100 includes a compact manifold 112 that can accommodate narrow packaging environments.

Figure 2:
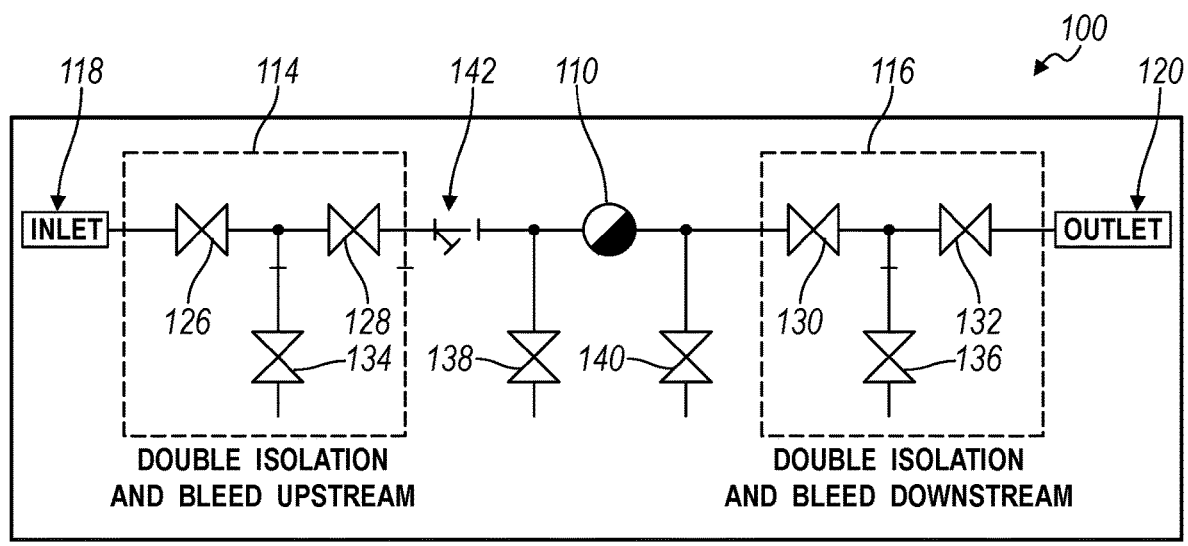
FIG. 2 is a schematic diagram of the steam trap and valve assembly station of FIG. 1.

Referring to FIG. 2, the inlet valve assembly 114 includes a first isolation valve 126 and a second isolation valve 128 that are connected in series between the inlet port 118 and the steam trap 110. When closed, each isolation valve 126, 128 isolates, or blocks, the steam/condensate mixture from flowing to the steam trap 110. The second isolation valve 128 provides a backup valve in the event the first isolation valve 126 begins to leak. Similarly, the outlet valve assembly 116 includes a first isolation valve 130 and a second isolation valve 132 that are connected in series between the steam trap 110 and the outlet port 120, according to one or more embodiments. When closed, each outlet isolation valve 130, 132 isolates, or blocks, the condensate from flowing from the steam trap 110 and exiting the station 100. The second isolation valve 132 provides a backup valve in the event the first isolation valve 130 begins to leak. Other embodiments of the station 100 include an inlet valve assembly 114 with double isolation, i.e., a first and second isolation valves 126, 128 and an outlet valve assembly 116 with only one isolation valve.

The station 100 includes additional valves for draining fluid, e.g., liquid or gas, from the system 102. The inlet valve assembly 114 includes a bleed valve 134 and the outlet valve assembly 116 includes a bleed valve 136 that each connect between corresponding isolation valves to allow a user to drain or bleed steam/condensate that may be trapped between the valves when both are closed. The station 100 also includes a drain/depressurizing valve 138 upstream of the steam trap 110 and a test valve 140 downstream of the steam trap 110 to drain additional fluid from the station 100. In one or more embodiments, the station 100 also includes a strainer 142 to filter solid particles, e.g., dirt, scale and metal, from the system 102.

Figure 3:
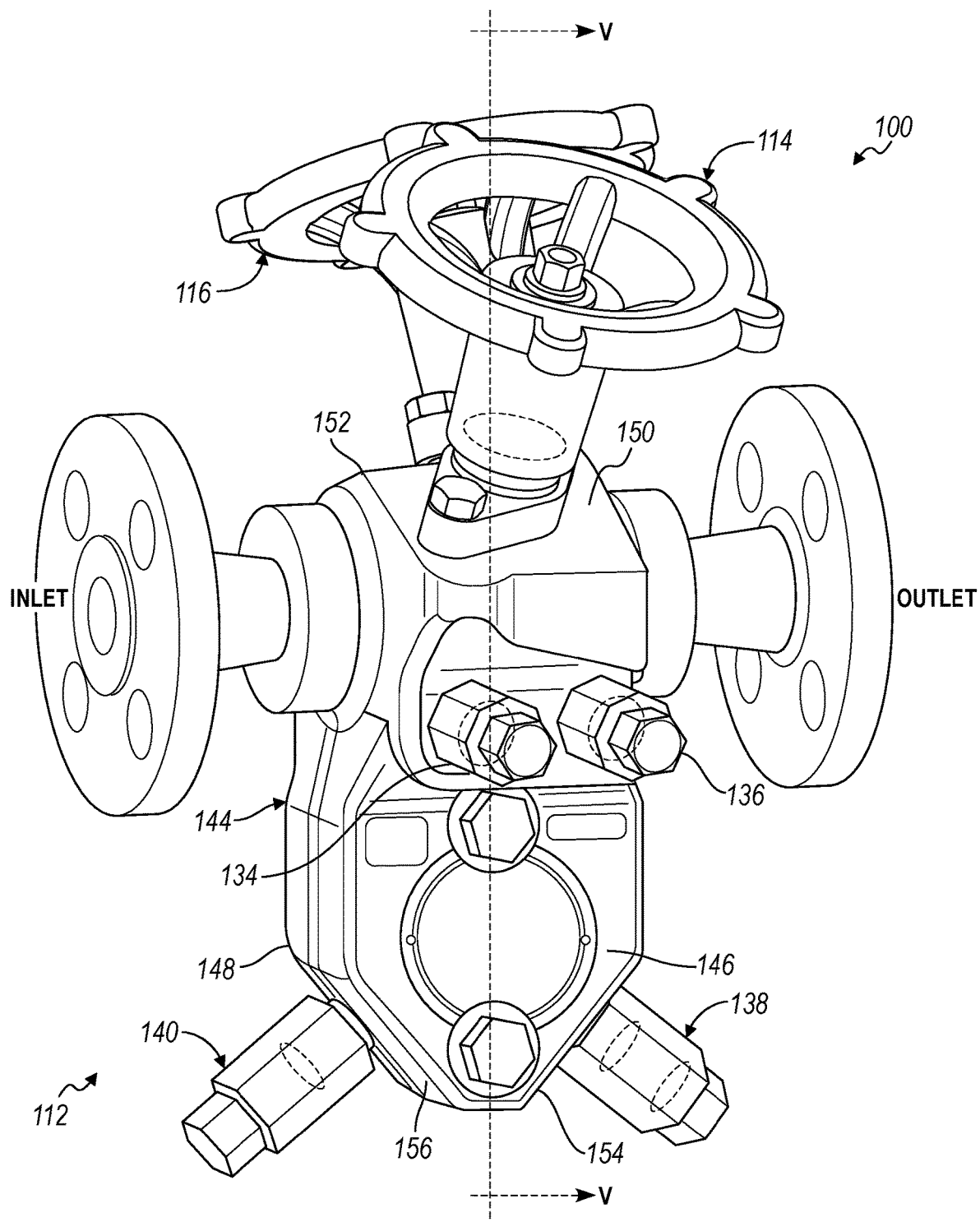
FIG. 3 is a front perspective view of the station of FIG. 1, illustrated without the steam trap.

Referring to FIG. 3, the manifold 112 includes a body 144 that is formed with a front face 146, a rear face 148, first and second upper faces 150, 152, and first and second lower faces 154, 156. The inlet and outlet bleed valves 134, 136 are mounted to the front face 146. The steam trap 110 (FIG. 1) is mounted to the rear face 148. The inlet valve assembly 114 is mounted to the first upper face 150, and the outlet valve assembly 116 is mounted to the second upper face 152. The drain/depressurizing valve 138 is mounted to the first lower face 154, and the test valve 140 is mounted to the second lower face 156.

Figure 4:
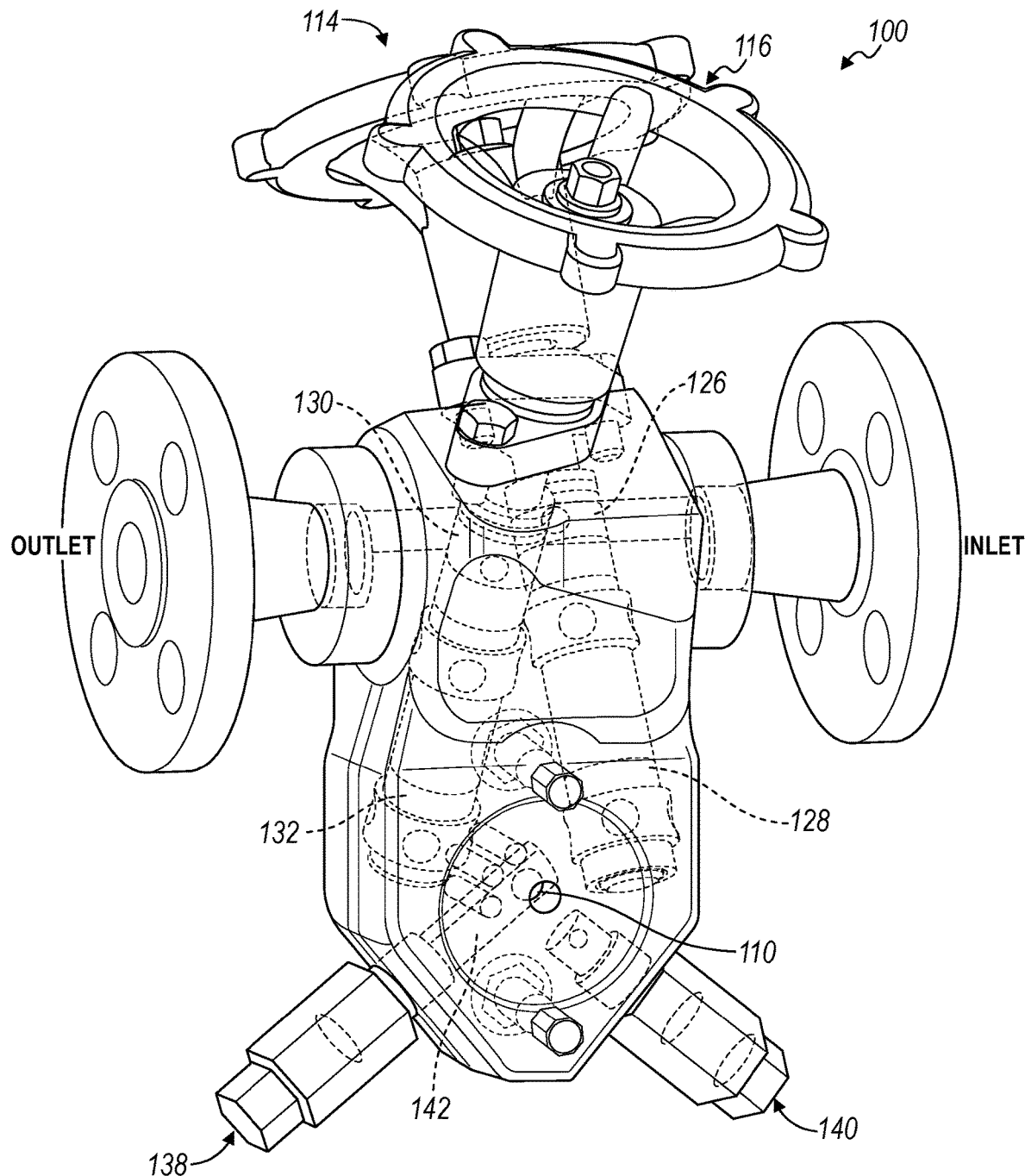
FIG. 4 is a rear perspective view of the station of FIG. 3, illustrated with internal components shown in hidden line.
Figure 5:
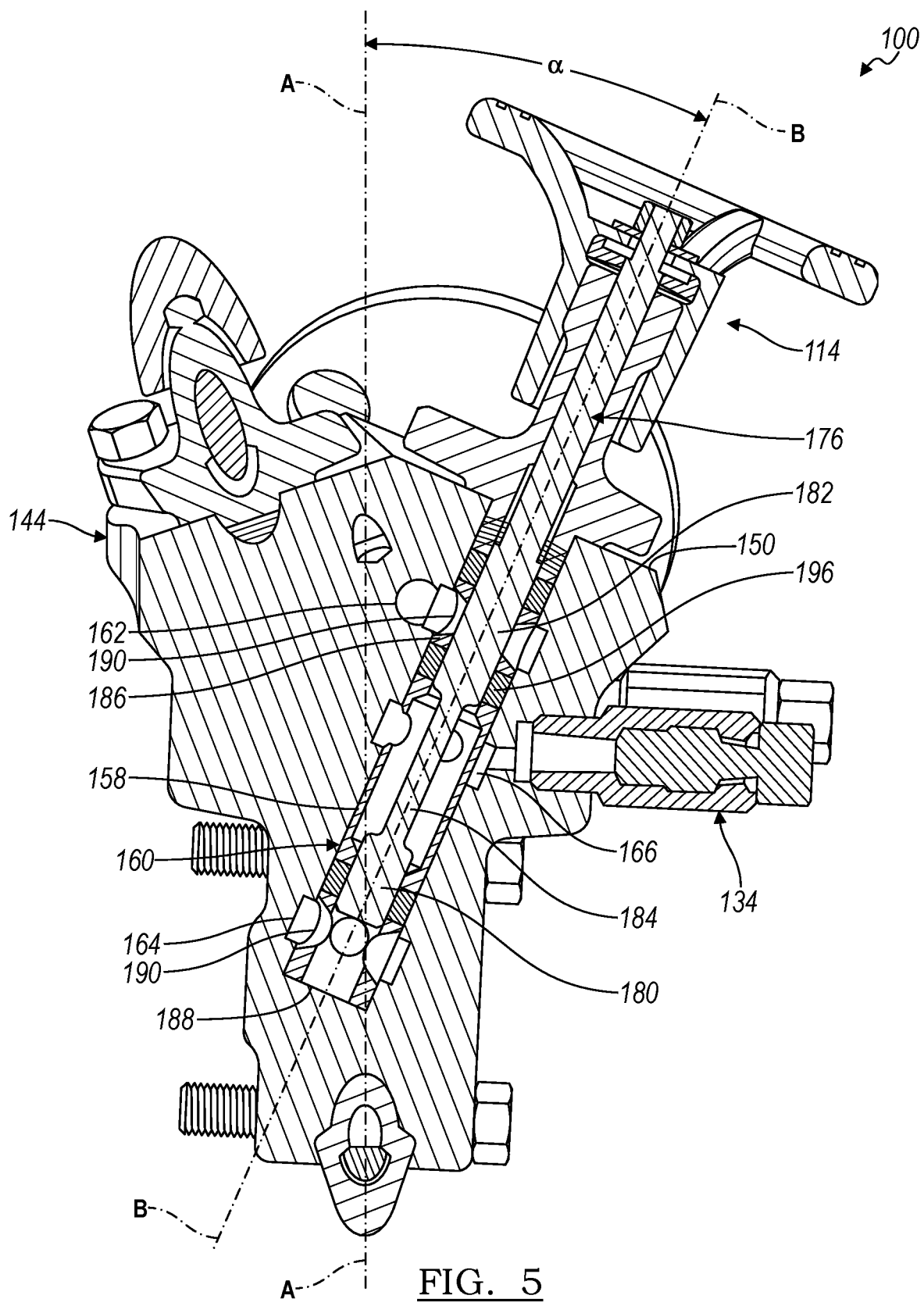
FIG. 5 is a section view of the station of FIG. 3 taken along section line V-V.

Referring to FIGS. 4 and 5, the valves extend into the body 144 to interconnect multiple fluid passages. With reference to FIG. 5, the body 144 includes a first inner wall 158 that defines an inlet valve chamber 160 having a generally tubular shape that extends from the first upper face 150 to a central portion of the body 144 at an angle α relative to a transverse axis A-A. The body 144 includes an inlet passage 162 that is in fluid communication with the inlet port 118 (FIG. 1) to receive the steam/condensate mixture. The inlet passage 162 connects the inlet port 118 to an upper portion of the inlet valve chamber 160. The body 144 also includes an inlet trap passage 164 that is in fluid communication with an inlet port (not shown) of the steam trap 110 and a lower portion of the inlet valve chamber 160. The inlet trap passage 164 connects the inlet port 118 to the steam trap 110 to provide the steam/condensate mixture to the steam trap 110. The body 144 also includes an inlet bleed passage 166 that is in fluid communication with the inlet bleed valve 134 and a central portion of the inlet valve chamber 160. The inlet bleed passage 166 connects the inlet valve chamber 160 to the inlet bleed valve 134 to allow manually draining of fluid from the inlet valve chamber 160.

Figure 6:
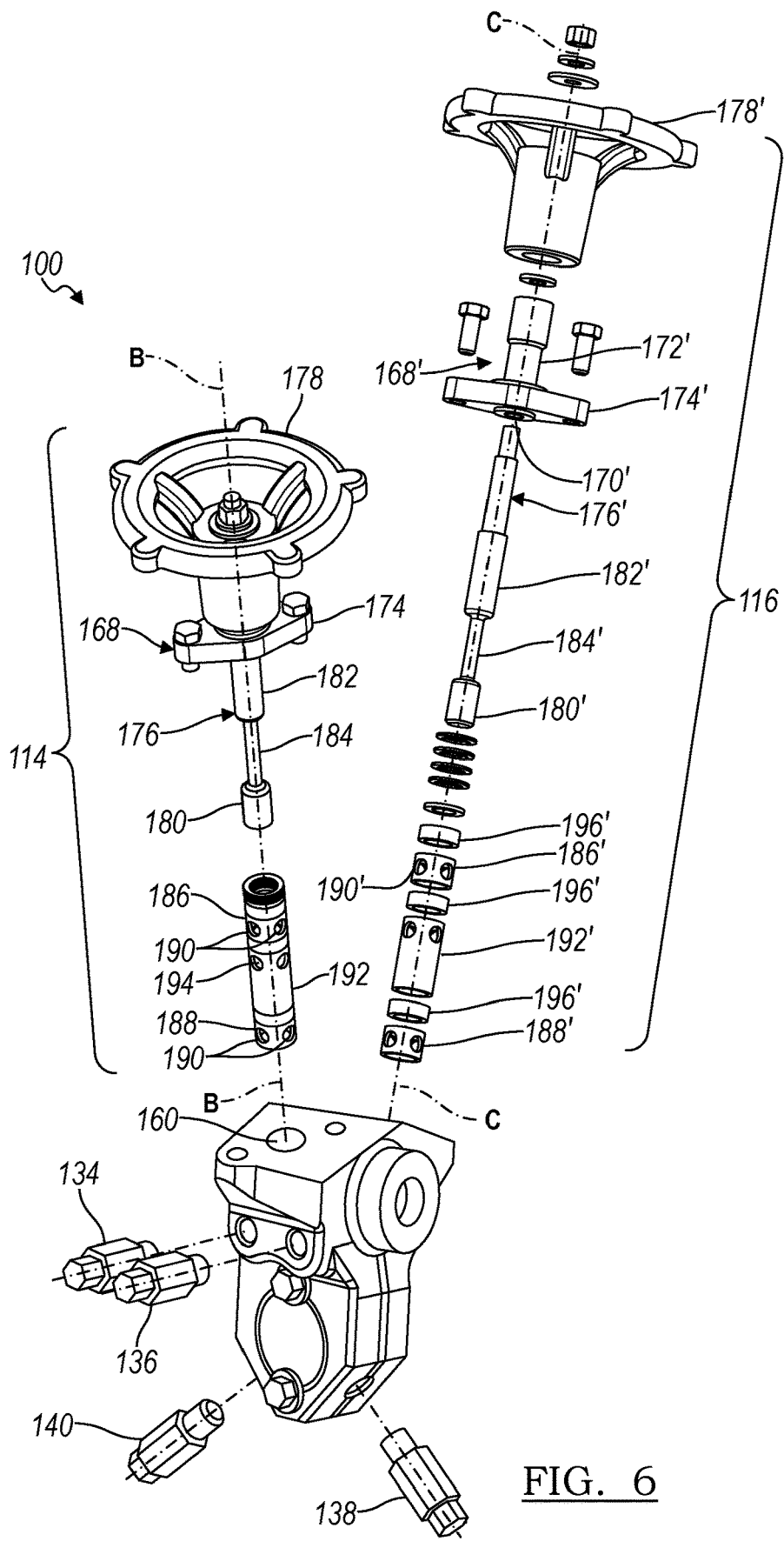
FIG. 6 is a partially exploded view of the station of FIG. 3.

With reference to FIG. 6, the inlet valve assembly 114 and the outlet valve assembly 116 are near-identical, according to one or more embodiments, with similar components denoted with an apostrophe. Each valve assembly 114, 116 includes a bonnet 168, 168' which includes a bore 170, 170' a hollow elongate portion 172, 172' and a transverse portion 174, 174'. Each transverse portion 174, 174' extends radially outward from the elongate portion 172, 172' and includes apertures for receiving fasteners to mount the valve assembly 114, 116 to the corresponding upper face 150, 152 of the body 144.

Each valve assembly 114, 116 also includes a valve stem 176, 176' and a handle 178, 178'. Each valve stem 176, 176' extends through the bore 170, 170' of the bonnet 168, 168' and into a valve chamber along an axis. The valve stem 176 of the inlet valve assembly 114 extends into the inlet valve chamber 160 along Axis B. The valve stem 176' of the outlet valve assembly 116 extends into an outlet valve chamber (not shown) along Axis C. Each valve stem 176, 176 includes a distal plug or piston 180, 180' and a central plug or piston 182, 182' that are separated by an intermediate shaft portion 184 that has a smaller diameter than the pistons 180, 182. Each valve assembly 114, 116 also includes a first flow collar 186, 186' and a second flow collar 188, 188' that are sized to receive the outer diameter of the central piston 182, 182' and the distal piston 180, 180' respectfully. Each flow collar 186, 186', 188, 188' includes a pair of radial ports 190, 190' to facilitate fluid communication. Each handle 178, 178' is attached to a distal end of the valve stem 176, 176' and mounted for rotation about the elongate portion 172, 172' of the bonnet 168, 168' whereby manual rotation of the handle 178, 178' results in rotation and translation of the valve stem 176, 176' and the pistons 180, 180', 182, 182' within the corresponding valve chamber.

Each valve assembly 114, 116 also includes a bleed flow tube or collar 192, 192' that is located between the first and second flow collars 186, 186', 188, 188' and coupled to the intermediate shaft portion 184, 184'. Each bleed flow collar 192, 192' is formed with a bore with an inner diameter that is greater than an outer diameter of the distal piston 180, 180' and the central piston 182, 182' such that it does not move with the valve stem 176. Each bleed flow collar 192, 192' includes radial ports 194, 194' that are aligned with the corresponding bleed passage regardless of the valve stem 176, 176' position such that the bleed flow collar 192, 192' facilitates fluid communication when the bleed valve 134, 136 is open.

Each valve assembly 114, 116 includes multiple gaskets 196, 196' that are each formed in an annular shape and disposed along the length of the valve stem 176, 176' to block fluid flow. In the illustrated embodiment, each valve assembly 114, 116 includes three gaskets 196, 196', one disposed on each side of the first flow collar 186, 186', and another gasket 196, 196' disposed between the bleed flow collar 192, 192' and the second flow collar 188, 188'. In one embodiment, the gaskets 196, 196' are formed of a rigid material such as graphite or stainless steel. In other embodiments, the gaskets 196, 196' are formed of a flexible material, such as a polymer or rubber.

Referring back to FIG. 5, a radial port 190 of the first flow collar 186 is aligned with the inlet passage 162 to receive the steam/condensate mixture from the inlet port 118 (shown in FIG. 1). However, when the inlet valve assembly 114 is in the closed position as illustrated in FIG. 5, the outer diameter of the central plug 182 engages the inner diameter of an intermediate gasket 196 to block the steam/condensate mixture from flowing through the inlet valve chamber 160. When the inlet valve assembly 114 is in the open position (not shown), the valve stem 176 is translated outward such that the intermediate shaft portion 184 is adjacent the intermediate gasket 196 and the distal piston 180 is longitudinally spaced apart from a lower gasket 196 such that the steam/condensate mixture flows into the inlet valve chamber

160 along the valve stem 176 and through the radial ports 190 of the second flow collar 188 to the inlet trap passage 164 and on to the steam trap 110 (shown in FIG. 1).

The station 100 can accommodate numerous threaded and weld piping connections, such as: ½, ¾, and 1" National Pipe Thread (NPT) (including ¼ NPT for the blow down valves), British Standard Pipe Thread (BSPT) and British Standard Pipe Parallel (BSPP) Thread connections; ½, ¾ and 1" Socket Weld (SW) piping connections; and ½, ¾ 1" Butt Weld (BW) piping connections. The station 100 can also accommodate numerous flanged connections: EN1092-1 Industrial Standard: DN15, 20 and 25 PN40 RF/ASME B16.5 ½, ¾ and 1" 150 RF, 300RF.

Referring back to FIG. 2, maintenance may be performed on the station 100 by first closing the inlet isolation valves 126, 128, e.g., by turning the handle 178 clockwise, then closing the outlet isolation valves 130, 132, e.g., by turning the handle 178' clockwise. Then, after the temperature within the station 100 decreases below a predetermined threshold temperature, e.g., below 60° C., opening the bleed valves 134, 136, then opening the drain/depressurizing valve 138 and the test valve 140. This sequence drains or bleeds any excess fluid from the station 100. Then maintenance personal can perform maintenance, such as remove the steam trap 110, without steam and/or condensate exiting from the steam trap connections.

The station 100 may be implemented in steam systems 102 for multiple industries, such as oil and gas, food, pharma and general industries, many of which require additional isolation valves (double isolation valves and bleed) when used on steam system(s). The station 100 provides such double isolation valves in a compact design. The station 100 also complies with the EN26554 Serie 1 standards for flanged face to face dimensions.

Figure 7:
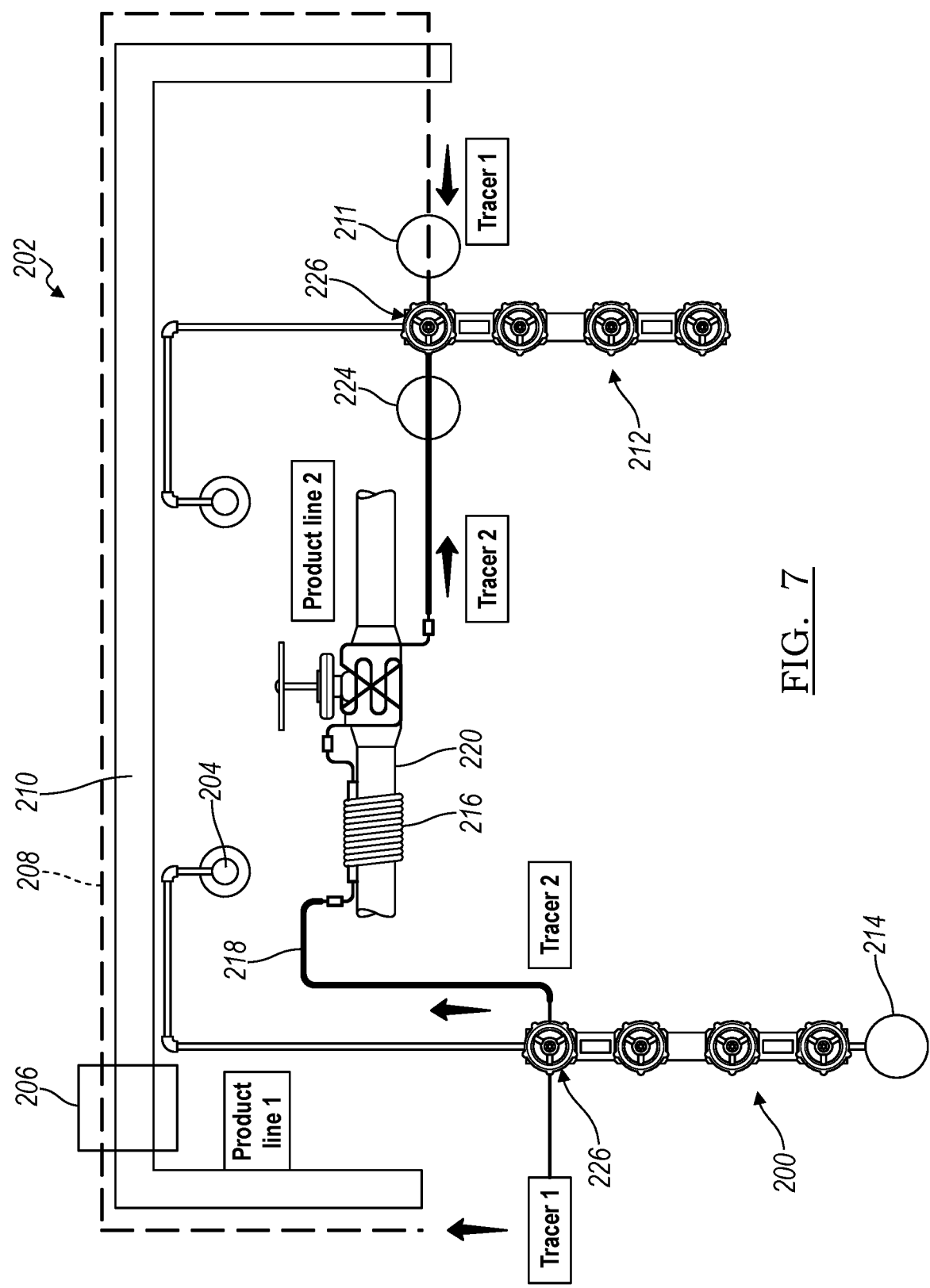
FIG. 7 is a schematic view of a steam system with multiple manifolds, including a condensate collecting manifold and a steam distribution manifold, according to one or more embodiments.

This station 100 will address several drawbacks of existing systems or technologies, e.g., when modifying existing piping configuration to meet new isolation requirements, e.g., additional isolating valves upstream and downstream of presently installed equipment. Additionally, the station 100 will also make the replacement of traditional trap valve stations a lot easier, reducing the number of potential steam leaks and saving space. All the components of a traditional trap valve station (upstream and downstream isolating valves—upstream and downstream bleed valves-test and blowdown valves—strainer screen-steam trap) can now be integrated in a universal connector having Din flanged face to face dimensions With reference to FIG. 7, a steam distribution manifold is illustrated in accordance with one or more embodiments and generally represented by numeral 200. The manifold 200 is illustrated as part of a steam tracing system 202. The steam tracing system 202 includes a steam source 204, such as a boiler, that receives water from a water source (not shown). The steam source 204 heats the water to generate steam and provides the steam to the steam distribution manifold 200.

The steam distribution manifold 200 provides steam to a first steam user 206, such as a heat transfer device, along a first tracer line 208. The first steam user 206 uses the steam to heat product flowing through a first product line 210, then provides the remaining steam/condensate mixture to a steam trap 211 that blocks the steam, while allowing condensate to pass. Condensate is then channeled towards a condensate collecting manifold 212. The steam system 202 includes a bottom drainage steam trap 214 that is connected to the steam distribution manifold 200 and allows the condensate to pass while blocking steam, thus allowing the condensate to return to the steam source 204 through a dedicated line.

The steam distribution manifold 200 also provides steam to a second steam user 216, such as a heat transfer device, along a second tracer line 218 according to one or more embodiments. The second steam user 216 uses the steam to heat product flowing through a second product line 220, then provides the remaining steam/condensate mixture to the condensate collecting manifold 212. The steam system 202 includes another steam trap 224 that is connected to the condensate collecting manifold 212 and separates the condensate from the steam and returns the condensate to the steam source 204 along a drain line.

Figure 8:
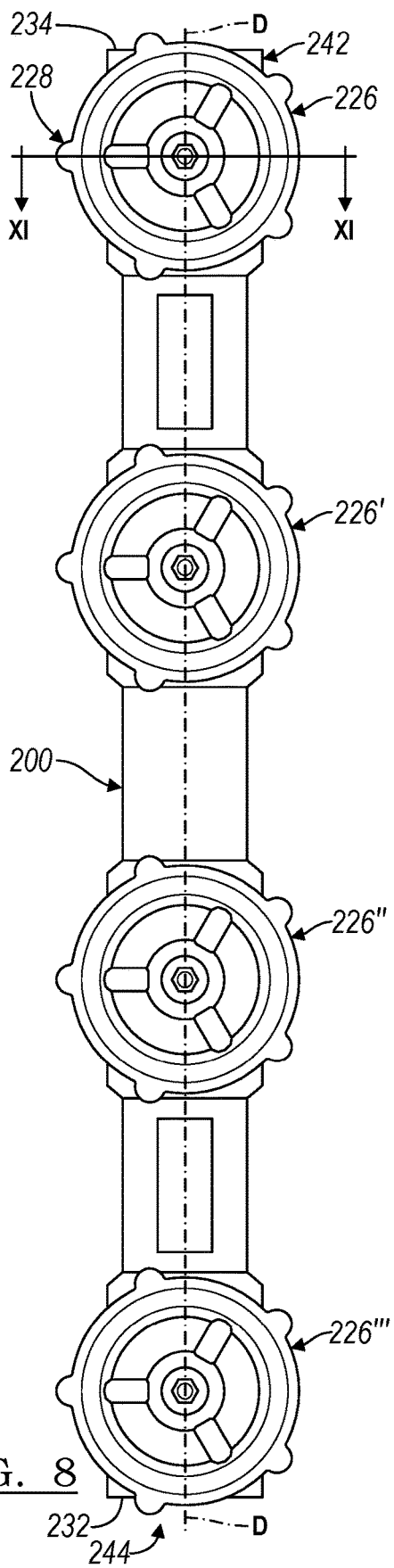
FIG. 8 is a top view of the steam distribution manifold of FIG. 7.
Figure 9:
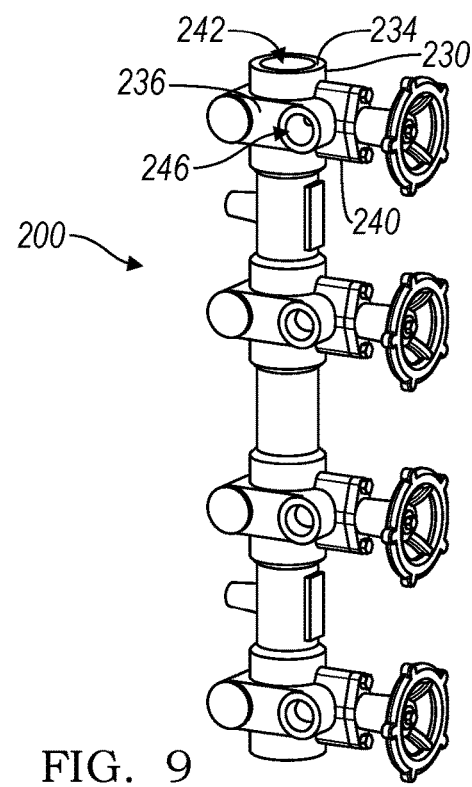
FIG. 9 is a left-side perspective view of the manifold of FIG. 8.
Figure 10:
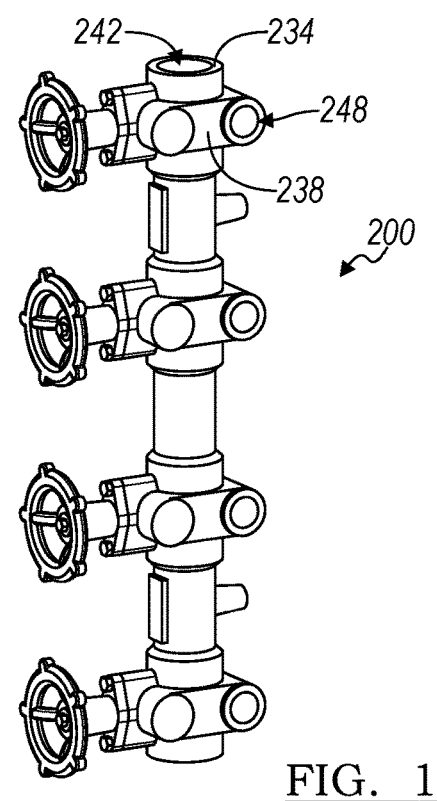
FIG. 10 is a right-side perspective view of the manifold of FIG. 8.

Referring to FIGS. 8-10, the steam distribution manifold 200 defines multiple fluid/steam passages and supports multiple valve assemblies 226. The illustrated embodiment depicts a manifold 200 having four valve assemblies 226, 226', 226", 226''' however other embodiments include more or less than four valve assemblies. The manifold 200 includes a body 228 that is formed with a top face 230, a front face 232, a rear face 234, a first side face 236 and a second side face 238. The body 228 includes a boss 240 that extends from the top face 230 to receive the single valve stem piston assembly 226 according to one or more embodiments. The body 228 includes an inlet port 242 that is formed in the rear face 234 for receiving the steam/condensate mixture and an outlet port 244 formed in the front face 232 through which the condensate exits the manifold 200.

Figure 11:
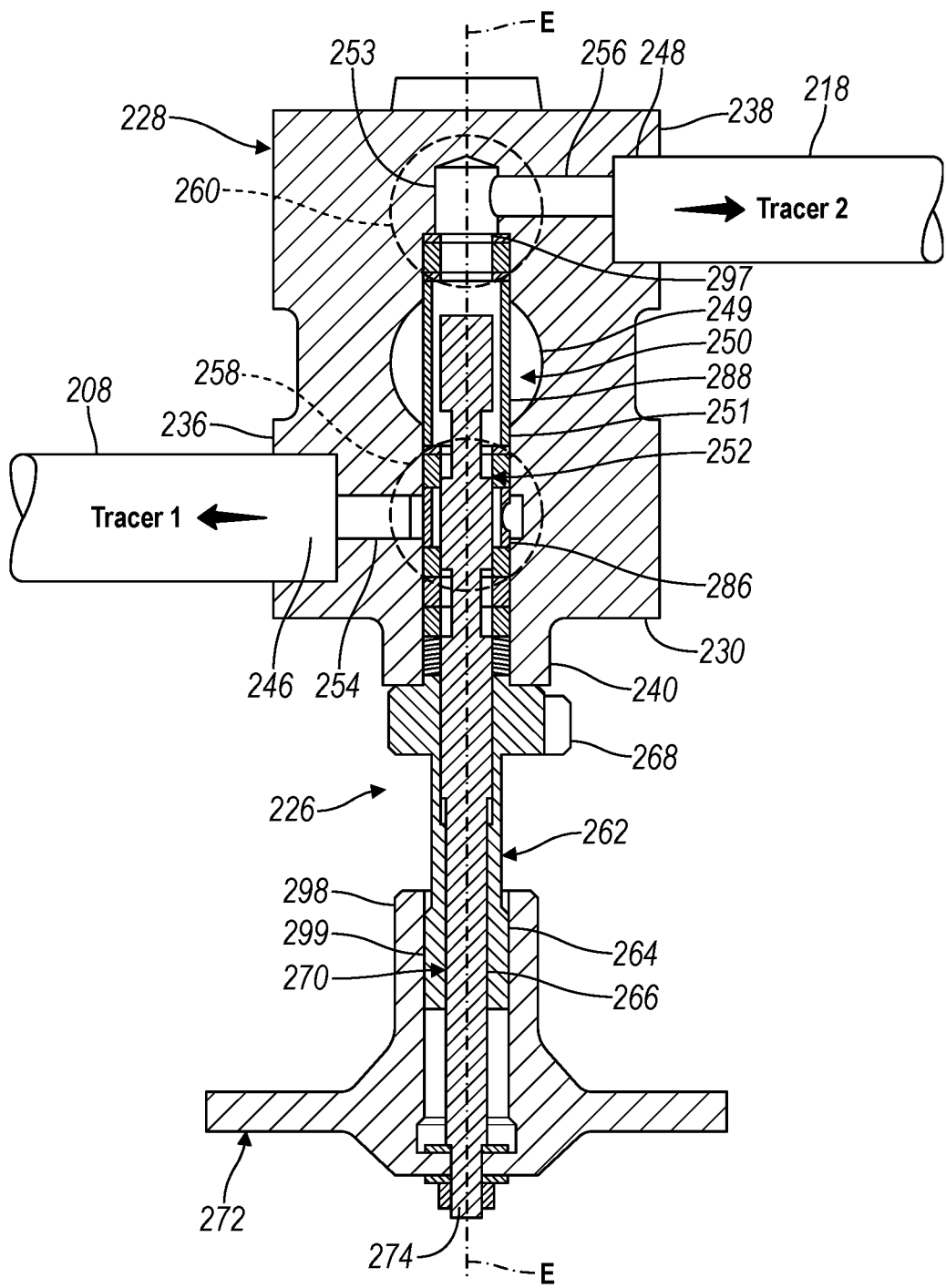
FIG. 11 is a section view of the manifold of FIG. 8 taken along section line XI-XI.

With reference to FIG. 11, the body 228 includes a first tracer port 246 that is formed in the first side face 236 to connect the inlet port 242 to the first steam user 206 through the first tracer line 208. The body 228 also includes a second tracer port 248 that is formed in the second side face 238 to connect the inlet port 242 to the second steam user 216 through the second tracer line 218.

The body 228 defines multiple fluid/steam passages. The body 228 includes a first inner wall 249 that defines a chamber 250 having a generally tubular shape that extends from the inlet port 242 to the outlet port 244 through a central portion of the body 228 along a longitudinal Axis D-D (FIG. 8). The body 228 also includes a second inner wall 251 that defines a valve chamber 252 that extends from the top face 230 into the body 228 along a transverse Axis E-E to intersect the chamber 250. The valve chamber 252 is formed as a counterbore with a distal pocket 253 that has a smaller inner diameter than the rest of the valve chamber 252. The body 228 includes a first passage 254 that is in steam communication with the first tracer port 246. The first passage 254 connects the valve chamber 252 to the first tracer port 246 to provide steam to the first tracer line 208. The body 228 includes a second passage 256 that is in steam communication with the second tracer port 248. The second passage 256 connects the distal pocket 253 of the valve chamber 252 to the second tracer port 248 to provide steam to the second tracer line 218.

The single valve stem piston assembly 226 extends into the valve chamber 252 of the body 228 to connect/disconnect the multiple steam passages. The single valve stem piston assembly 226 includes a first piston valve sub-assembly 258 to connect/disconnect the valve chamber 252 to the first tracer port 246 to control steam flow to the first tracer line 208. The single valve stem piston assembly 226 also includes a second piston valve sub-assembly 260 to connect/disconnect the valve chamber 252 to the second tracer port 248 to control steam flow to the second tracer line 218.

Figure 12:
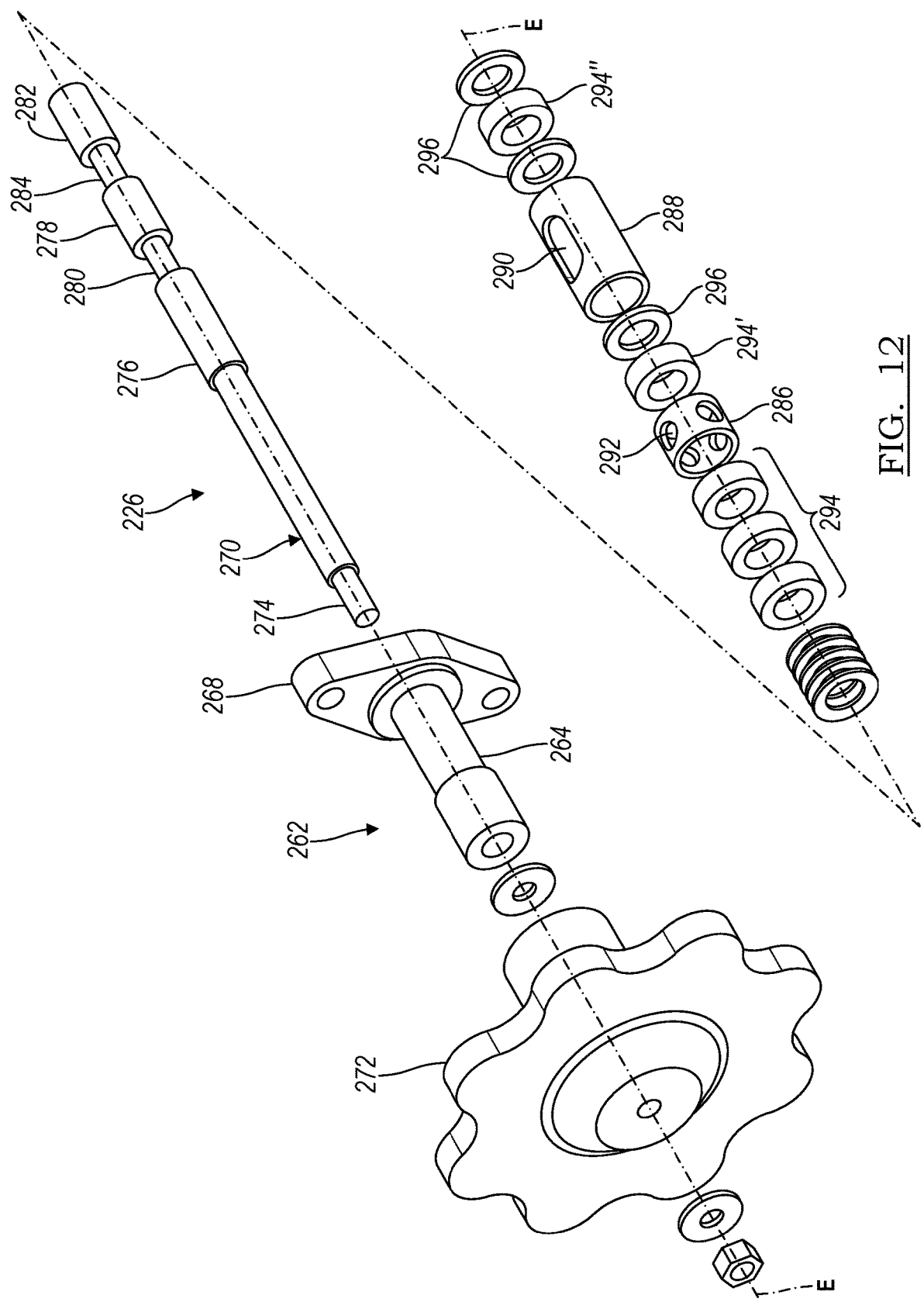
FIG. 12 is an exploded view of a valve assembly of the manifold of FIG. 8.

With reference to FIGS. 11 and 12, the single valve stem piston assembly 226 includes a bonnet 262 that mounts to the body 228 of the manifold 200. The bonnet 262 includes an elongate portion 264 with a bore 266 formed through that is aligned with the transverse Axis E-E. The bonnet 262 also includes a flange 268 that extends radially outward from a proximal end of the elongate portion 264. The flange 268 includes apertures for receiving fasteners to mount the single valve stem piston assembly 226 to the body 228. The single valve stem piston assembly 226 also includes a valve stem 270 that is fixed to a handle 272. The valve stem 270 extends through the bore 266 of the bonnet 262 and into the valve chamber 252 along Axis E.

With reference to FIG. 12, the valve stem 270 includes a proximal end 274 that is fixed to the handle 272, e.g., by a fastener. The valve stem 270 translates along Axis E in response to rotation of the handle 272. The valve stem 270 includes a central piston 276 and an intermediate piston 278 that are separated by a first shaft portion 280. The valve stem 270 also includes a distal piston 282 that is separated from the intermediate piston 278 by a second shaft portion 284. The pistons 276, 278, 282 are generally cylindrical in shape with a common outer diameter that is larger than a common outer diameter of the first and second shaft portions 280, 284.

The single valve stem piston assembly 226 includes a flow collar 286 and a flow tube 288 that are secured within the valve chamber 252 of the body 228. The flow tube 288 includes one or more openings 290 to facilitate steam communication between the chamber 250 and the valve chamber 252. The flow collar 286 includes one or more radial ports 292 to facilitate steam communication between the valve chamber 252 and the first passage 254. Steam within the valve chamber 252 may flow through the radial ports 292 to the first passage 254.

The single valve stem piston assembly 226 includes washers 296 and gaskets 294 to axially align the flow collar 286 and the flow tube 288 within the valve chamber 252. The washers 296 and gaskets 294 are annular in shape with inner diameters sized to receive the valve stem 270. The single valve stem piston assembly 226 includes a distal-most gasket 294" flanked by a pair of washers 296 that abut a ledge 297 (shown in FIG. 11) formed in the valve chamber 252 to axially align the openings 290 of the flow tube 288 at the intersection of the chamber 250 and the valve chamber 252. The single valve stem piston assembly 226 includes an intermediate gasket 294' and washer 296 that are disposed between the flow tube 288 and the flow collar 286 to align the radial ports 292 with the first passage 254. The single valve stem piston assembly 226 includes additional gaskets 294 and washers 296 that are disposed between the flow collar 286 and the bonnet 262 to maintain the longitudinal alignment of the flow collar 286 and the flow tube 288 along Axis E within the valve chamber 252. In one embodiment, the gaskets 294 are formed of a rigid material such as graphite or stainless steel. In other embodiments, the gaskets 294 are formed of a flexible material, such as a polymer or rubber.

Referring back to FIG. 11, the handle 272 is fixed to a proximal end 274 of the valve stem 270 and mounted for rotation about the elongate portion 264 of the bonnet 262. The handle 272 includes a hub 298 with a bore 299 that is formed with internal threads that engage external threads formed on the elongate portion 264 of the bonnet 262, according to one or more embodiments. Rotation of the handle 272 results in translation of the valve stem 270 along Axis E within the valve chamber 252. The valve stem 270, together with the gaskets 294, 294', 294", form the first piston valve sub-assembly 258 and the second piston valve sub-assembly 260. The gaskets 294, 294', 294" are sized to engage the outer diameter of each piston 276, 278, 282 of the valve stem 270 to block steam flow. The gaskets 294, 294', 294" are also sized to not engage the outer diameter of each shaft portion 280, 284 of the valve stem 270 to allow steam flow.

FIGS. 13-20 illustrate adjustment of the single valve stem piston assembly 226 to four different positions to provide four different manifold operational configurations for individually controlling the first piston valve sub-assembly 258 and the second piston valve sub-assembly 260 according to one or more embodiments. The manifold operational configurations include: a first manifold operational configuration (FIGS. 13-14) in which both the first piston valve sub-assembly 258 and the second piston valve sub-assembly 260 are closed, which corresponds to a zero valve assembly position "POS 0"; a second manifold operational configuration (FIGS. 15-16) in which the first piston valve sub-assembly 258 is closed and the second piston valve sub-assembly 260 is open, which corresponds to a first piston valve sub-assembly position "POS 1"; a third manifold operational configuration (FIGS. 17-18) in which the first piston valve sub-assembly 258 is open and the second piston valve sub-assembly 260 is closed, which corresponds to a negative valve assembly position "POS -1"; and a fourth manifold operational configuration (FIGS. 19-20) in which the first piston valve sub-assembly 258 is open and the second piston valve sub-assembly 260 is open, which corresponds to a second piston valve sub-assembly position "POS 2."

Figure 14:
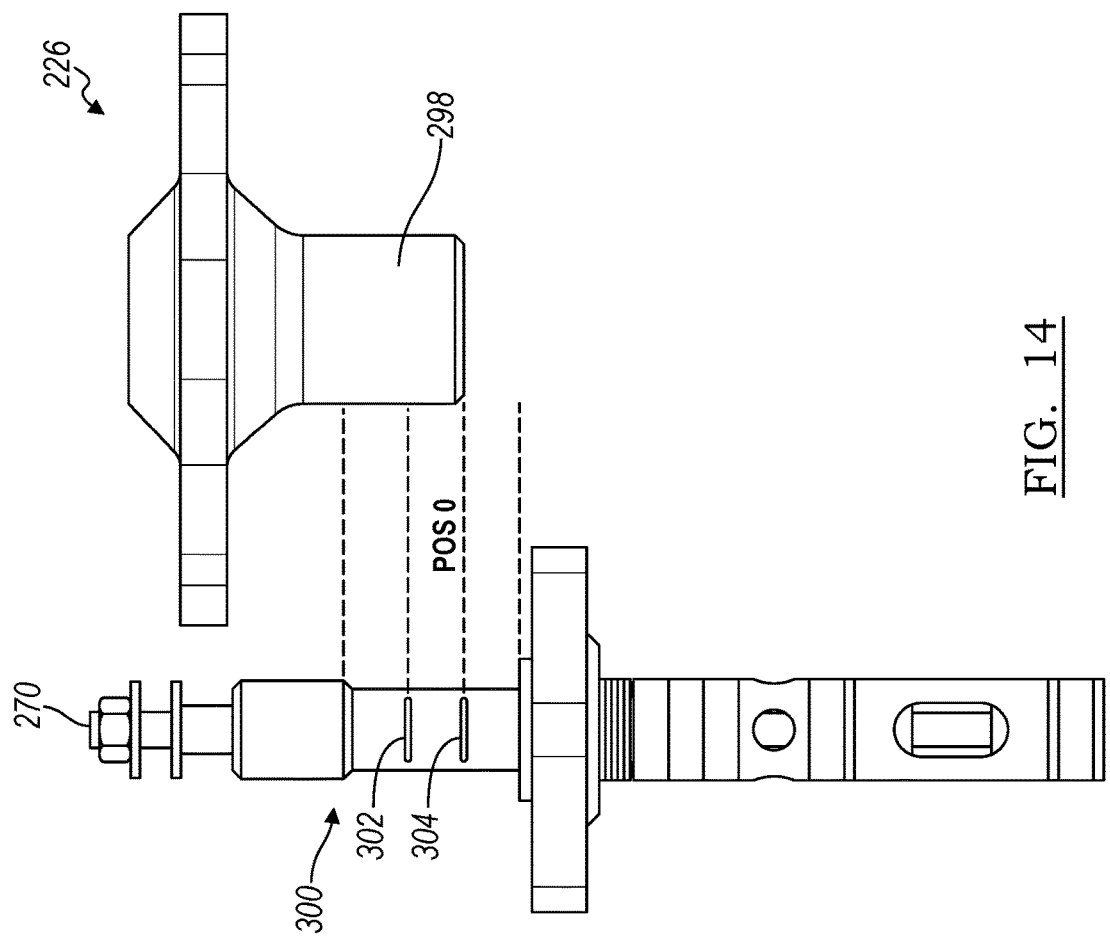
FIG. 14 is a partially exploded view of the valve assembly of FIG. 13.
Figure 13:
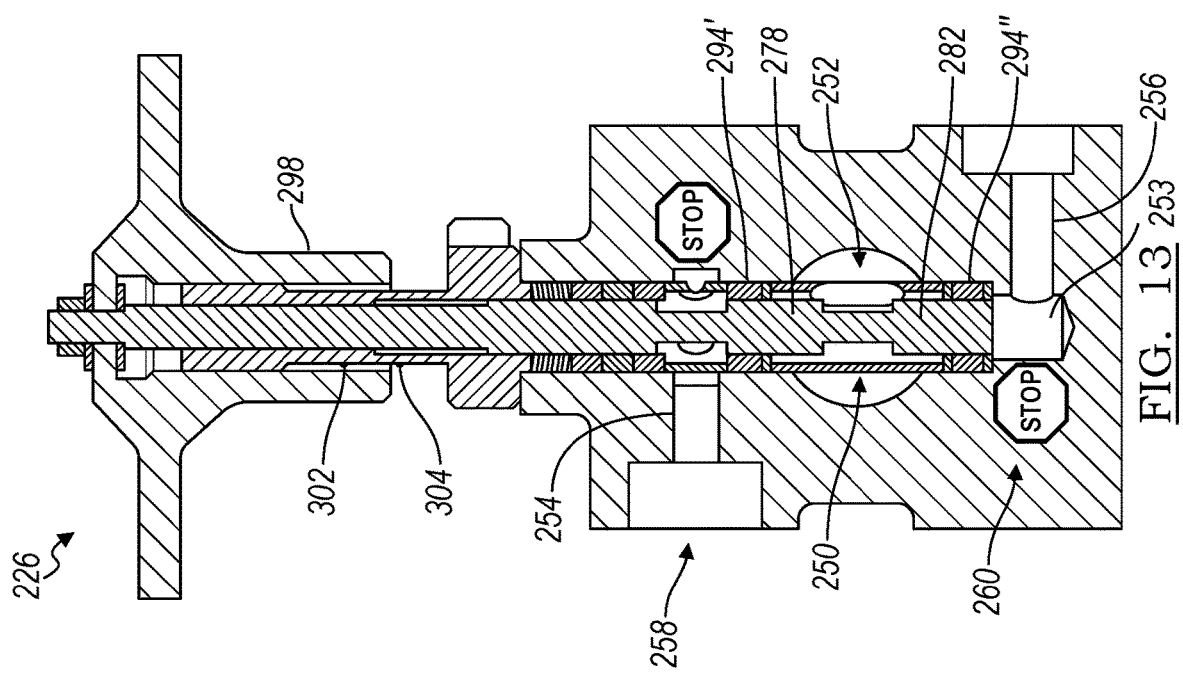
FIG. 13 is a section view of the manifold of FIG. 8 according to one or more embodiments, illustrating a first manifold operational configuration.

FIGS. 13-14 illustrate the first manifold operational configuration in which both the first piston valve sub-assembly 258 and the second piston valve sub-assembly 260 are closed. The single valve stem piston assembly 226 is arranged in the zero position "POS 0" in which the valve stem 270 is extended to an intermediate position within the valve chamber 252. In the first manifold operational configuration and POS 0, the intermediate piston 278 is adjacent to an intermediate gasket 294', such that an inner diameter of the gasket 294' engages an outer diameter of the intermediate piston 278 to block steam flow to the first passage 254, thereby closing the first piston valve sub-assembly 258. The distal piston 282 is adjacent to the distal-most gasket 294", such that an inner diameter of the gasket 294" engages an outer diameter of the distal piston 282 to block steam flow to the distal pocket 253 of the valve chamber 252 and the second passage 256, thereby closing the second piston valve sub-assembly 260. Since both valve assemblies 258, 260 are closed in the first manifold operational configuration, steam flows through the chamber 250 from the inlet port 242 without entering the first tracer line 208 or the second tracer line 218. Condensate resulting from radiation losses is discharged through the outlet port 244 (shown in FIG. 8).

Figure 16:
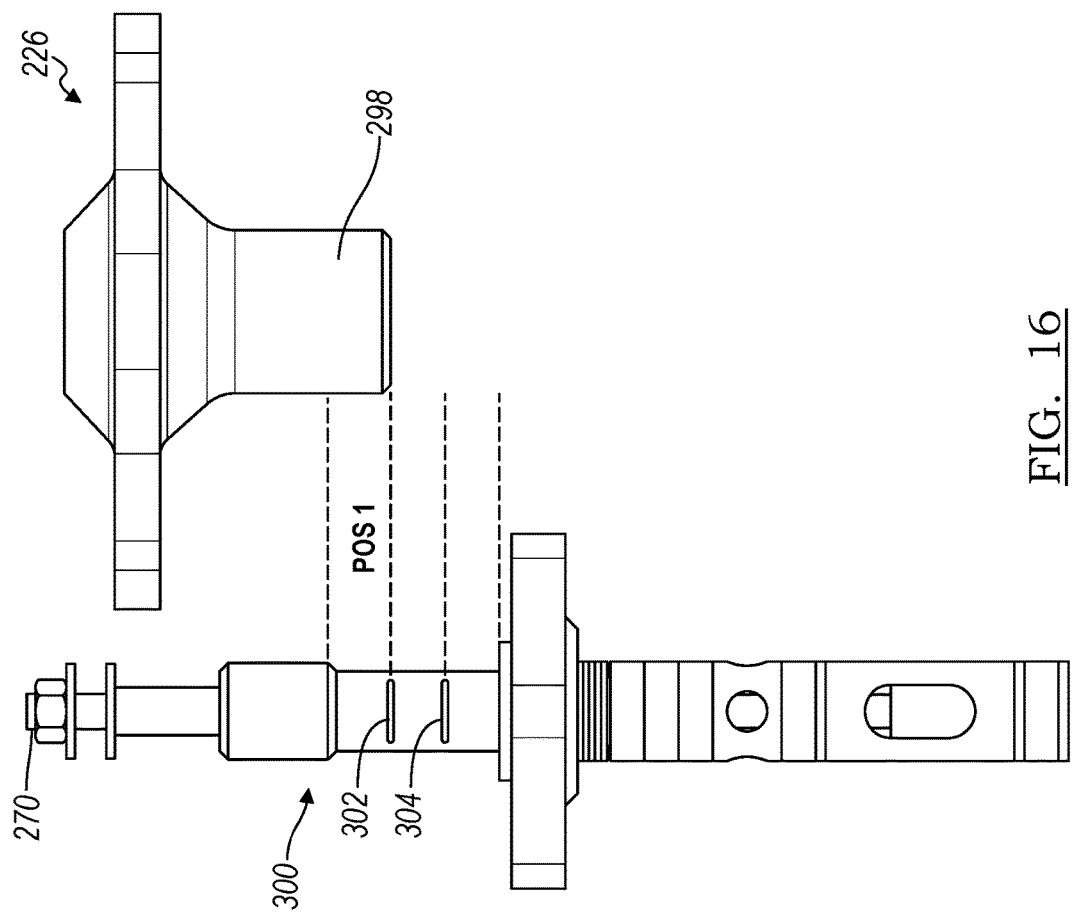
FIG. 16 is a partially exploded view of the valve assembly of FIG. 15.
Figure 15:
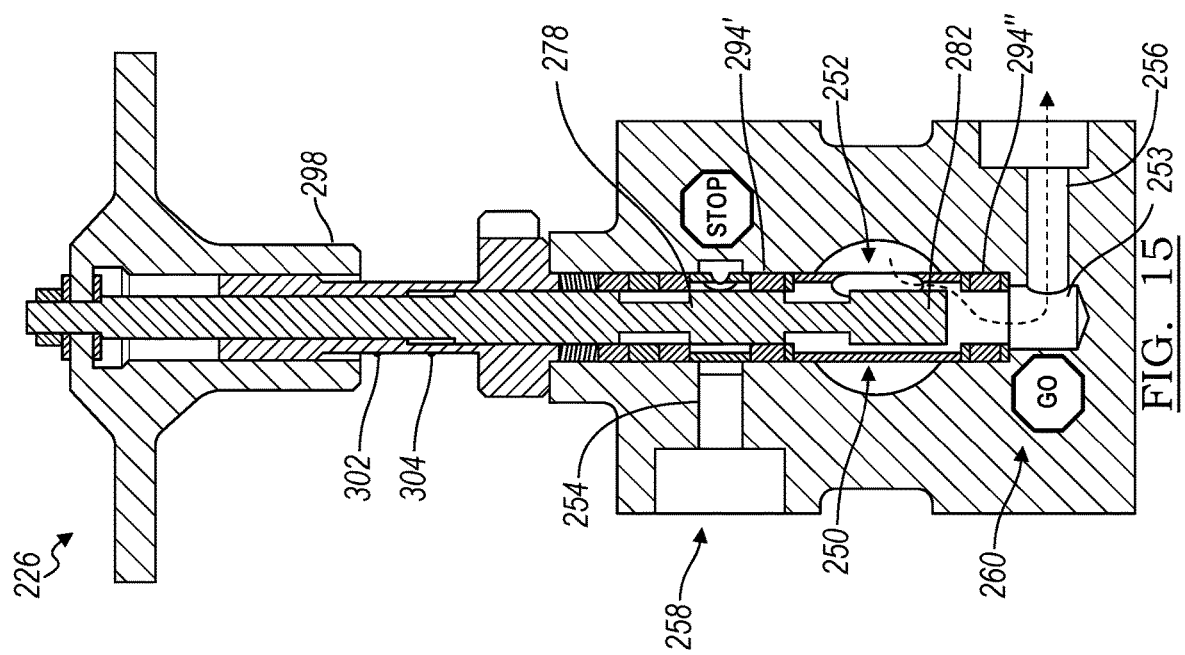
FIG. 15 is another section view of the manifold of FIG. 13, illustrating a second manifold operational configuration.

FIGS. 15-16 illustrate the second manifold operational configuration in which the first piston valve sub-assembly 258 is closed and the second piston valve sub-assembly 260 is open. The single valve stem piston assembly 226 is arranged in the first position "POS 1" in which the valve stem 270 is translated outward from the body 228, as compared to POS 0 shown in FIGS. 13-14. In the second manifold operational configuration and POS 1, the intermediate piston 278 is adjacent to the intermediate gasket 294', such that an inner diameter of the gasket 294' engages an outer diameter of the intermediate piston 278 to block steam flow to the first passage 254, thereby closing the first piston valve sub-assembly 258. The distal piston 282 is spaced apart from the distal-most gasket 294", such that steam can flow through the inner diameter of the gasket 294" and through the distal pocket 253 to the second passage 256, thereby opening the second piston valve sub-assembly 260. Since the first piston valve sub-assembly 258 is closed and the second piston valve sub-assembly 260 is open in the second manifold operational configuration, steam flows through the chamber 250 and through the open second piston valve sub-assembly 260 of the valve chamber 252, thus entering the second tracer line 218. The condensate resulting from radiation losses is discharged through the valve chamber 252, as depicted by a dashed line in FIG. 15, to the outlet port 244 (shown in FIG. 8).

Figure 18:
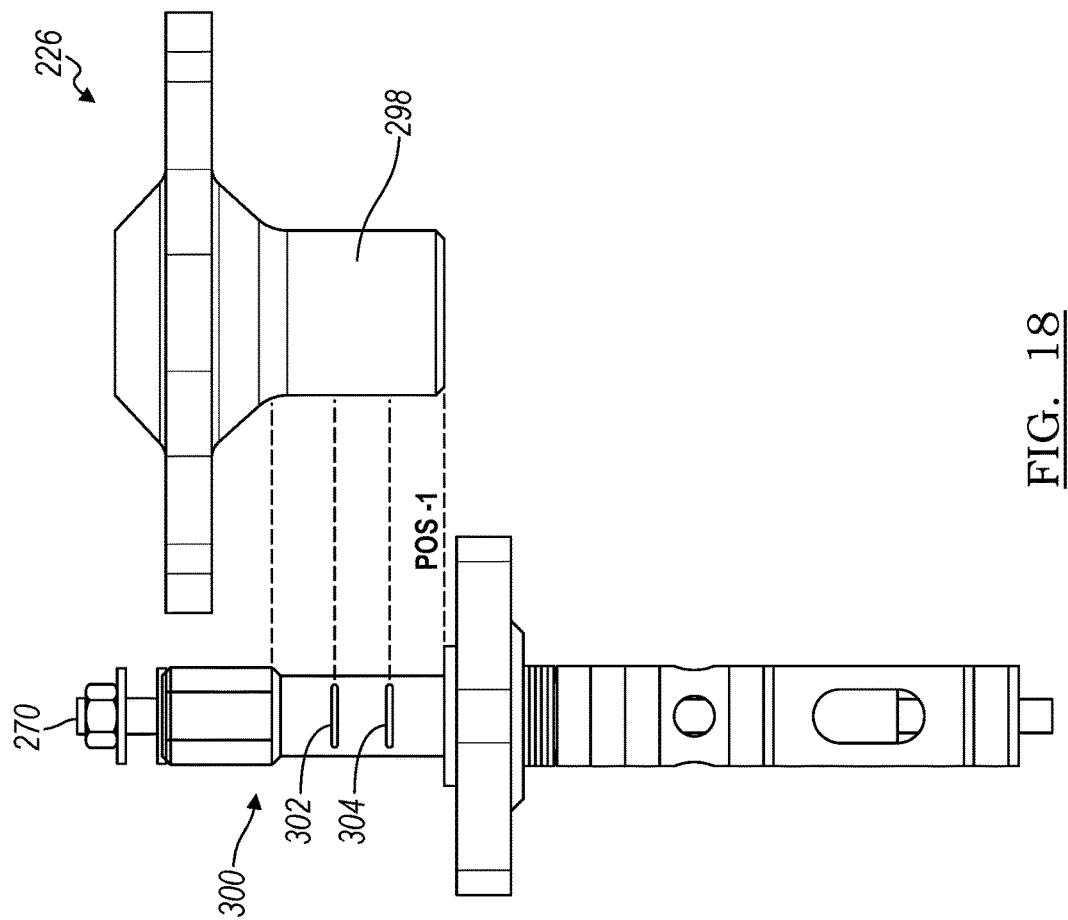
FIG. 18 is a partially exploded view of the valve assembly of FIG. 17.
Figure 17:
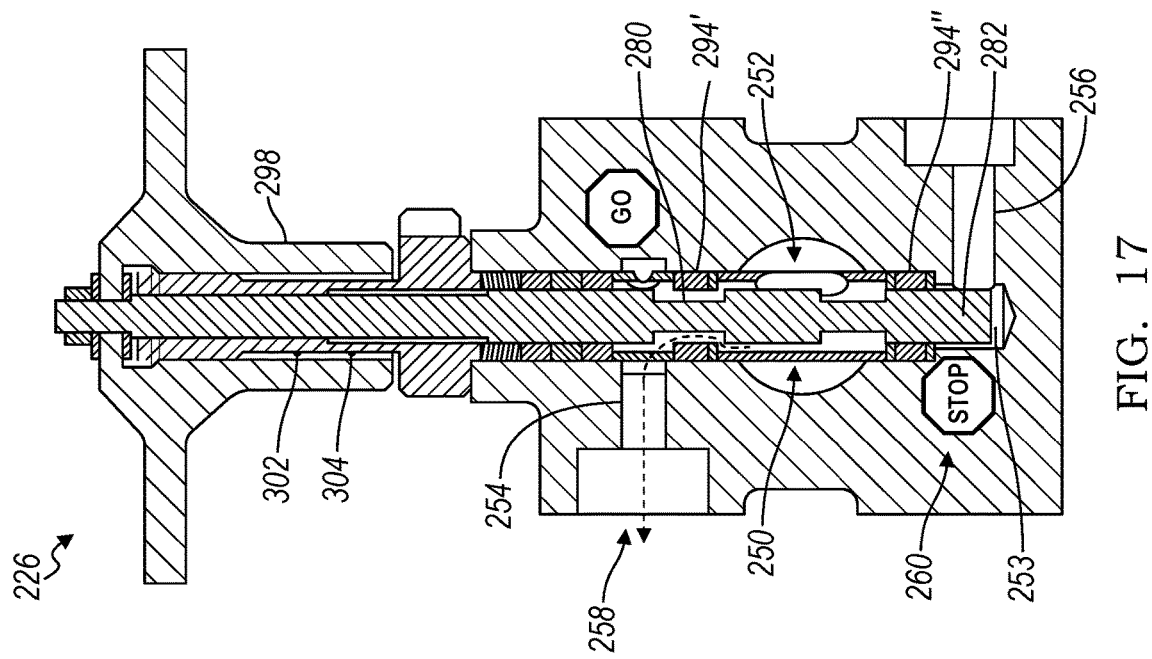
FIG. 17 is another section view of the manifold of FIG. 13, illustrating a third manifold operational configuration.

FIGS. 17-18 illustrate the third manifold operational configuration in which the first piston valve sub-assembly 258 is open and the second piston valve sub-assembly 260 is closed. The single valve stem piston assembly 226 is arranged in the negative position "POS −1" in which the valve stem 270 is translated inward toward the body 228, as compared to POS 0 shown in FIGS. 13-14. In the third manifold operational configuration and POS −1, the first shaft portion 280 is adjacent to the intermediate gasket 294', such that there is a gap between the inner diameter of the gasket 294' and the outer diameter of the first shaft portion 280 to allow steam to flow to the first passage 254, thereby opening the first piston valve sub-assembly 258. The distal piston 282 is adjacent to the distal-most gasket 294", such that an inner diameter of the gasket 294" engages an outer diameter of the distal piston 282 to block steam flow to the distal pocket 253 of the valve chamber 252 and the second passage 256, thereby closing the second piston valve sub-assembly 260. Since the first piston valve sub-assembly 258 is open and the second piston valve sub-assembly 260 is closed in the second manifold operational configuration, steam flows through the chamber 250 and through the open first piston valve sub-assembly 258 of the valve chamber 252, as depicted by a dashed line in FIG. 17, thus entering the first tracer line 208. The condensate resulting from radiation losses is discharged through the valve chamber 252 toward the outlet port 244 (shown in FIG. 8).

Figure 20:
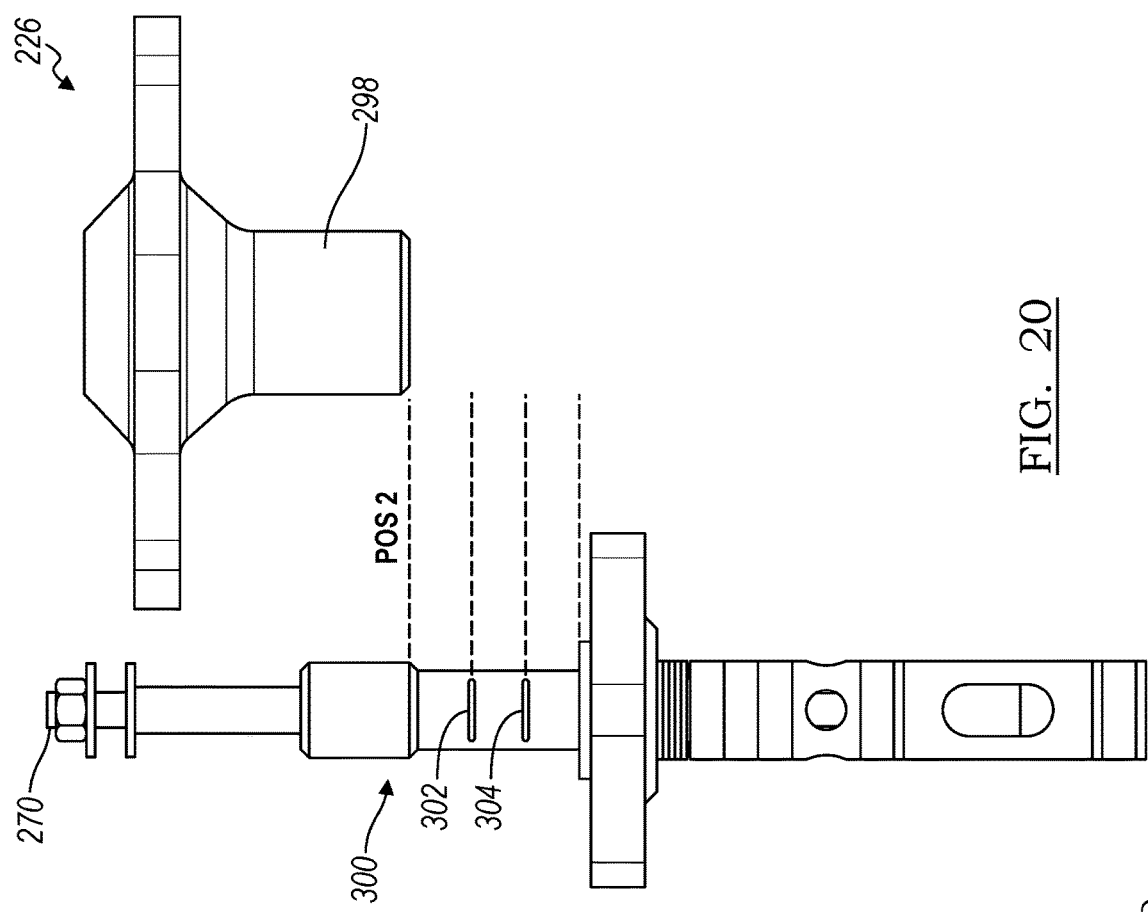
FIG. 20 is a partially exploded view of the valve assembly of FIG. 19.
Figure 19:
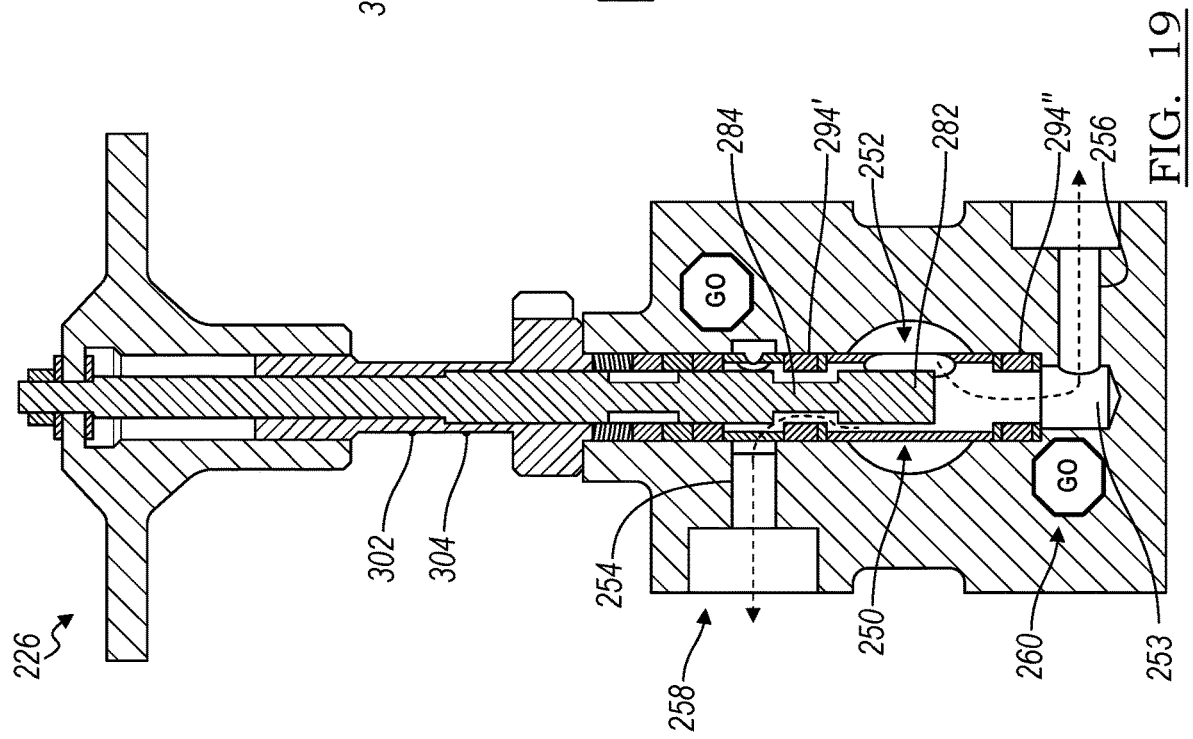
FIG. 19 is another section view of the manifold of FIG. 13, illustrating a fourth manifold operational configuration.

FIGS. 19-20 illustrate the fourth manifold operational configuration in which the first piston valve sub-assembly 258 is open and the second piston valve sub-assembly 260 is open. The single valve stem piston assembly 226 is arranged in the second positive position "POS 2" in which the valve stem 270 has translated further outward from the body 228, as compared to the POS 1 shown in FIGS. 15-16. In the fourth manifold operational configuration and POS 2, the second shaft portion 284 is adjacent to the intermediate gasket 294', such that there is a gap between the inner diameter of the gasket 294 and the outer diameter of the second shaft portion 284 to allow steam to flow to the first passage 254, thereby opening the first piston valve sub-assembly 258. The distal piston 282 is spaced apart from the distal-most gasket 294", such that steam can flow through the inner diameter of the gasket 294" through the distal pocket 253 to the first passage 254, thereby opening the second piston valve sub-assembly 260. Since both the first piston valve sub-assembly 258 and the second piston valve sub-assembly 260 are open in the fourth manifold operational configuration, steam flows through the chamber 250 and through the open first piston valve sub-assembly 258 and the open second piston valve sub-assembly 260, as depicted by a dashed line in FIG. 19. The condensate resulting from radiation losses is discharged through the valve chamber 252 toward the outlet port 244 (shown in FIG. 8).

With reference to FIGS. 13-20, the single valve stem piston assembly 226 includes indicia 300 to indicate the current position of the single valve stem piston assembly 226, which corresponds to whether the first piston valve sub-assembly 258 and the second piston valve sub-assembly 260 are open or closed. The handle 272 is shown offset from the valve stem 270 in FIG. 20 to illustrate the indicia 300. The indicia 300 includes a first marker 302 and a second marker 304 that are spaced apart from each other along the length of the elongate portion 264, according to one or more embodiments. In one embodiment, the markers 302, 304 are projections that are integrally formed with the bonnet 262 and extend radially outward from the elongate portion 264. In other embodiments, the markers are affixed, e.g., painted or adhered, to the bonnet 262. The shape of the markers 302, 304 may differ to match various reading preferences.

As illustrated in FIGS. 19-20, when the single valve stem piston assembly 226 is adjusted to POS 2, both the first marker 302 and the second marker 304 are exposed and visible to a user. However, referring to FIGS. 17-18, when the single valve stem piston assembly 226 is adjusted to POS −1, both the first marker 302 and the second marker 304 are concealed by the hub 298 and not visible to a user. When the single valve stem piston assembly 226 is adjusted to POS 1, as shown in FIGS. 15-16, the second marker 304 is visible and the first marker 302 is aligned with an edge of the hub 298. With reference to FIGS. 13-14, when the single valve stem piston assembly 226 is adjusted to POS 0, the first marker 302 is concealed and the second marker 304 is aligned with an edge of the hub 298.

The steam distribution manifold 200 and the condensate collecting manifold 212 (shown in FIG. 7) are generally identical in structure, each include at least one valve assembly for individually controlling two tracer lines. Accordingly, the above description of the steam distribution manifold 200 is applicable to the condensate collecting manifold 212.

With reference to FIGS. 21-24, a single valve stem piston assembly is illustrated in accordance with one or more embodiments and generally represented by numeral 426. The single valve stem piston assembly 426 includes similar components and functionality as the single valve stem piston assembly 426 described with reference to FIGS. 7-20, however the position of the valve stem corresponds to different manifold operating configurations.

Figure 21:
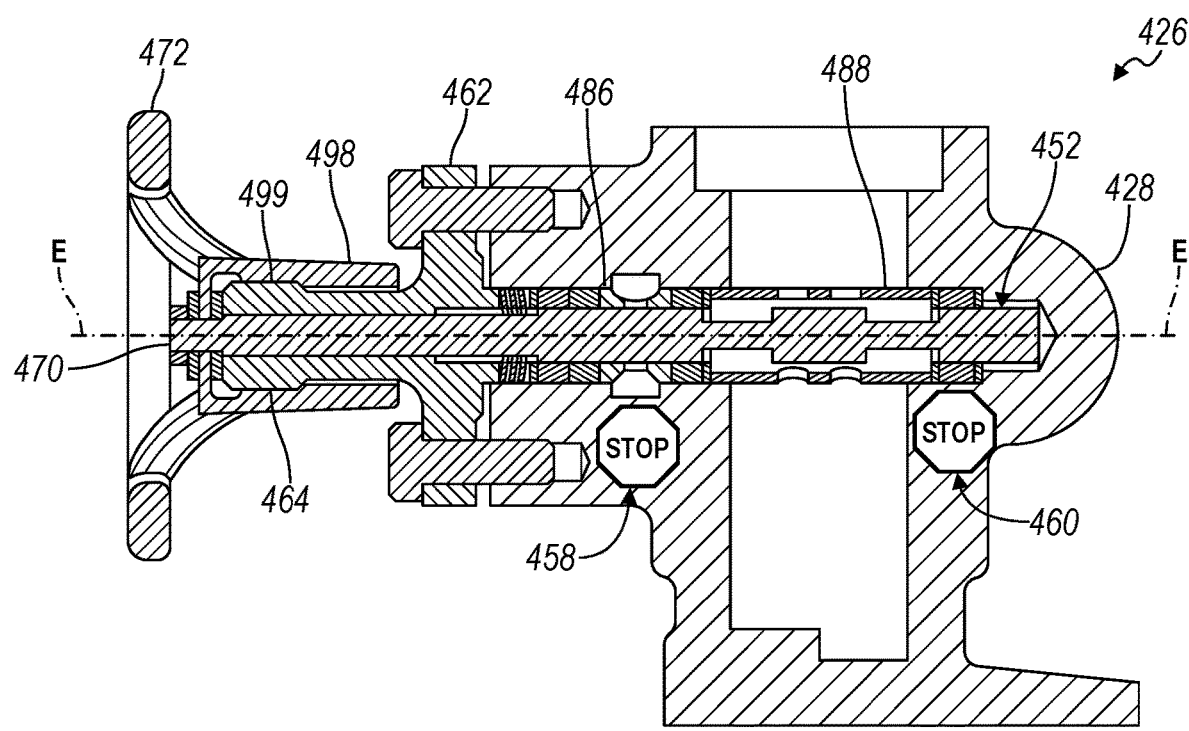
FIG. 21 is a section view of the manifold of FIG. 8 according to another embodiment, illustrating a first manifold operational configuration.

Referring to FIG. 21, the single valve stem piston assembly 426 includes a bonnet 462, a valve stem 470, and a handle 472. The single valve stem piston assembly 426 also includes a flow collar 486 and a flow tube 488 that are secured within a valve chamber 452 formed in a manifold body 428. The handle 472 includes a hub 498 with a bore 499 that is formed with internal threads that engage external threads formed on an elongate portion 464 of the bonnet 462. Rotation of the handle 472 results in translation of the valve stem 470 along Axis E within the valve chamber 452. Like the single valve stem piston assembly 226 of FIGS. 7-20, the single valve stem piston assembly 426 can be adjusted to four different configurations based on the location of the valve stem 470 within the valve chamber 452.

In FIG. 21, the single valve stem piston assembly 426 is arranged in a first configuration in which the valve stem 470 is translated fully inward to fully extend into the valve chamber 452, the first piston valve sub-assembly 458 is closed and the second piston valve sub-assembly 460 is closed. This first configuration of the single valve stem piston assembly 426 in which both valve assemblies are closed is similar to first configuration of the single valve stem piston assembly 226 illustrated in FIGS. 13 and 14, however the valve stem 470 is extended further inward.

Figure 22:
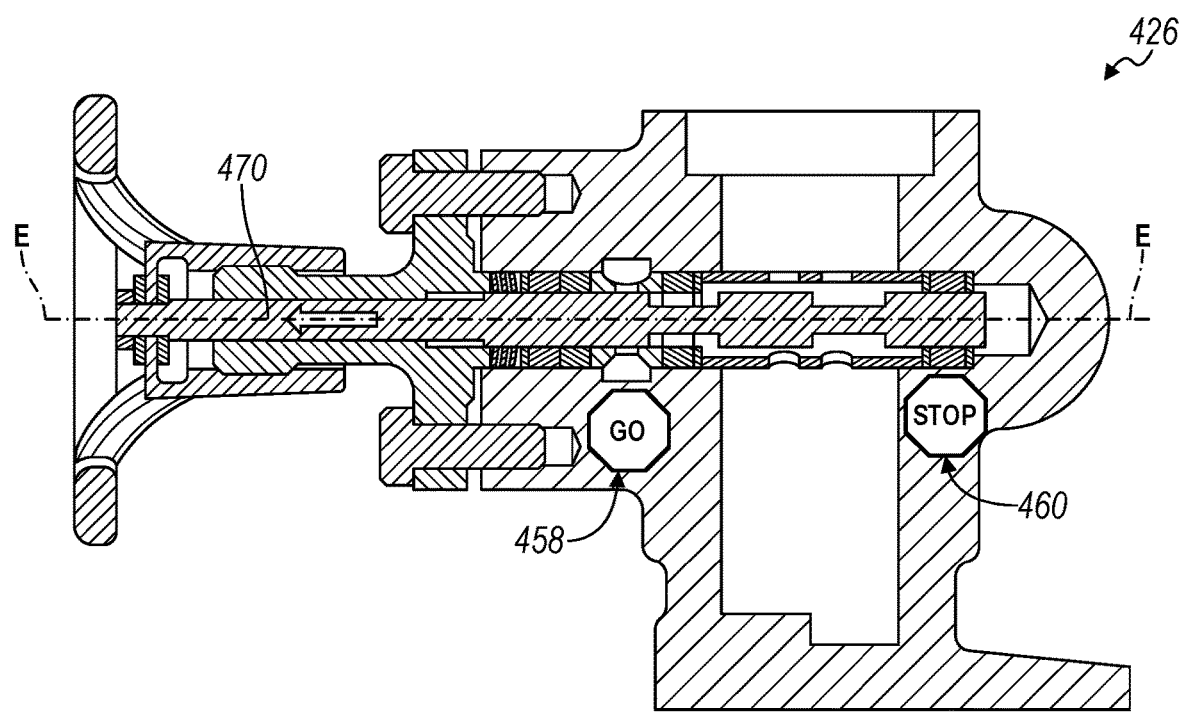
FIG. 22 is another section view of the manifold of FIG. 21, illustrating a second manifold operational configuration.

In FIG. 22, the single valve stem piston assembly 426 is arranged in a second configuration in which the valve stem 470 is translated further outward, as compared to the first configuration shown in FIG. 21, the first piston valve sub-assembly 458 is open and the second piston valve sub-assembly 460 is closed. This second configuration of the single valve stem piston assembly 426 in which the first piston valve sub-assembly 458 is open and the second piston valve sub-assembly 460 is closed is similar to third configuration of the single valve stem piston assembly 226 illustrated in FIGS. 17 and 18, however the valve stem 470 is extended further outward.

Figure 23:
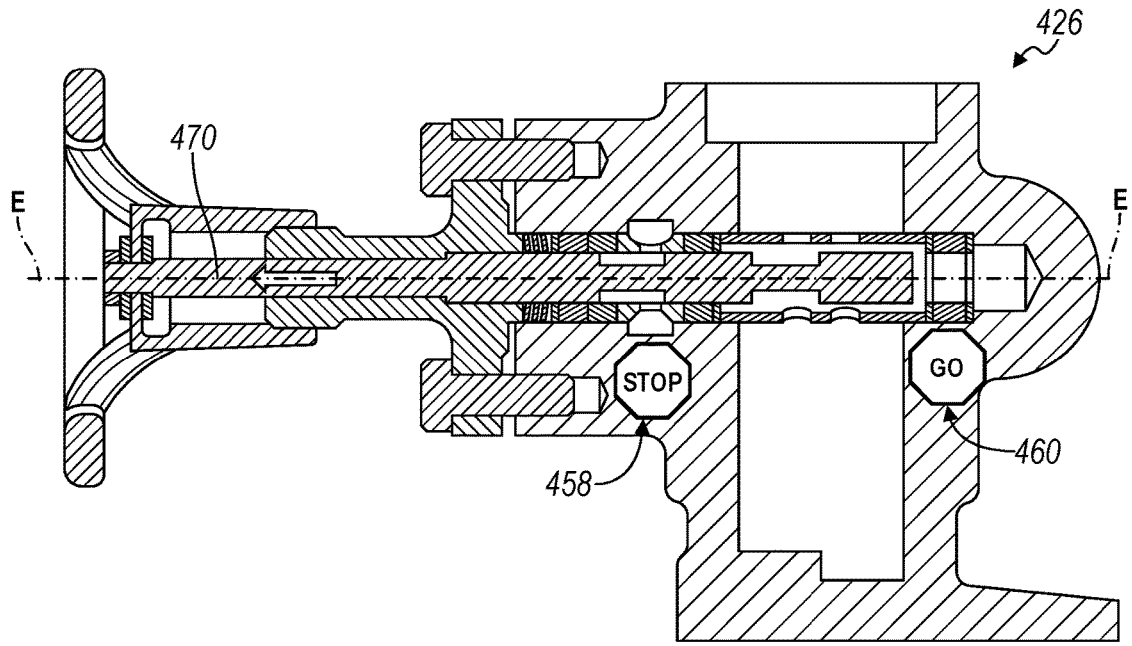
FIG. 23 is another section view of the manifold of FIG. 21, illustrating a third manifold operational configuration.

Referring to FIG. 23, the single valve stem piston assembly 426 can adjust to a third configuration in which the valve stem 470 is translated outward, as compared to the second configuration shown in FIG. 22, the first piston valve sub-assembly 458 is closed and the second piston valve sub-assembly 460 is open. This third configuration of the single valve stem piston assembly 426 in which the first piston valve sub-assembly 458 is closed and the second piston valve sub-assembly 460 is open is similar to the second configuration of the single valve stem piston assembly 226 illustrated in FIGS. 15 and 16.

Figure 24:
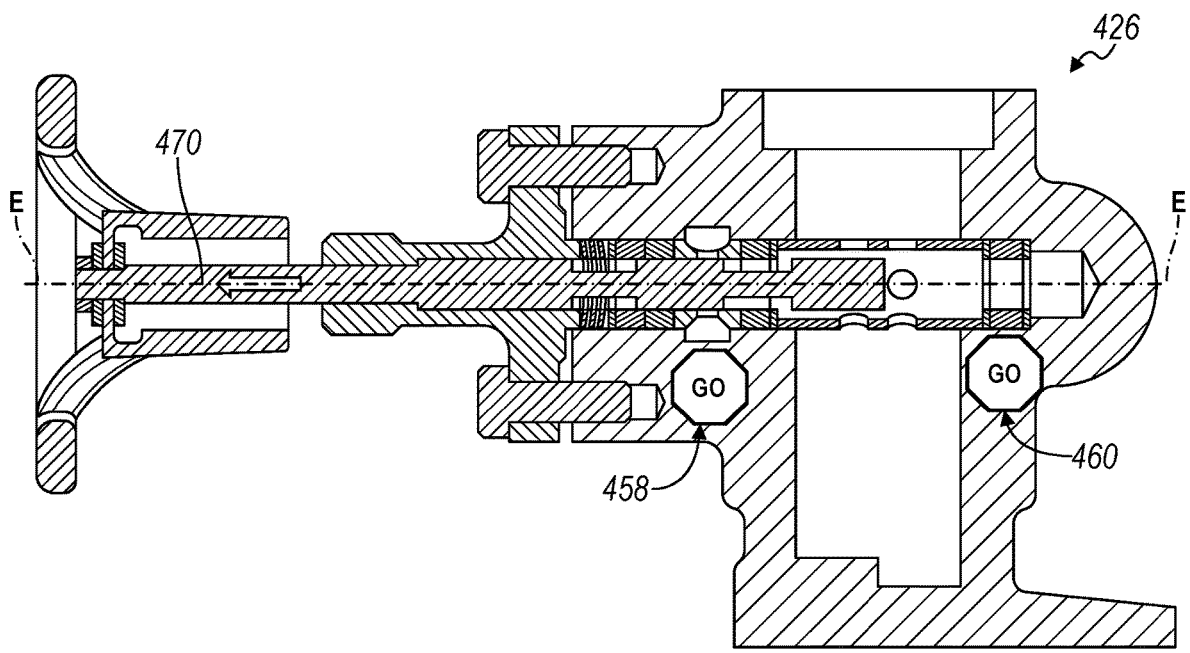
FIG. 24 is another section view of the manifold of FIG. 21, illustrating a fourth manifold operational configuration.

With reference to FIG. 24, the single valve stem piston assembly 426 can adjust to a fourth configuration in which the valve stem 470 is translated fully outward and both the first piston valve sub-assembly 458 and the second piston valve sub-assembly 460 are open. This fourth configuration of the single valve stem piston assembly 426 in which both valve assemblies are open is similar to the fourth configuration of the single valve stem piston assembly 226 illustrated in FIGS. 19 and 20.

The single valve stem piston assembly 226, 426 allows a user to individually control two valves within a manifold, i.e., the first piston valve sub-assembly 258, 458 and the second piston valve sub-assembly 260, 460 and corresponding first and second tracer lines 208, 218, with a single valve stem piston assembly 226. Accordingly, the manifold 200 includes fewer components, less weight, and smaller packaging size, as compared to existing manifolds. A steam system 202 including the manifold 200 may require less maintenance than existing steam systems.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A station for a steam system comprising:
   a body forming a first chamber extending between an inlet and an outlet, wherein the inlet is adapted to receive a mixture of steam and condensate, and a second chamber extending inward from a face of the body to intersect the first chamber, the body further forming a first passage extending from an intermediate region of the second chamber to a first port and a second passage extending from a distal region of the second chamber to a second port;
   a first gasket disposed in the intermediate region of the second chamber;
   a second gasket disposed in the distal region of the second chamber;
   a valve stem, mounted for translation within the second chamber between four positions to individually activate and deactivate the first port and the second port, with a central piston sized to engage the first gasket to block steam flow to the first port, and a distal piston longitudinally spaced apart from the central piston by a shaft portion and sized to engage the second gasket to block steam flow to the second port; and
   a steam trap coupled to the second port to separate condensate from the mixture of steam and condensate.

2. The station for a steam system of claim 1, wherein the shaft portion is formed with a radial dimension that is less than a corresponding radial dimension of at least one of the central piston and the distal piston to facilitate steam flow to the first port when arranged adjacent to the first gasket.

3. The station for a steam system of claim 1,
   wherein the valve stem is translatable to:
   a first position in which the central piston engages the first gasket to block steam flow to the first port, and the distal piston engages the second gasket to block steam flow to the second port,
   a second position in which the central piston engages the first gasket to block steam flow to the first port, and the distal piston is spaced apart from the second gasket to facilitate steam flow to the second port,
   a third position in which the shaft portion is arranged adjacent to the first gasket to facilitate steam flow to the first port, and the distal piston engages the second gasket to block steam flow to the second port, and
   a fourth position in which the shaft portion is arranged adjacent to the first gasket to facilitate steam flow to the first port, and the distal piston is spaced apart from the second gasket to facilitate steam flow to the second port.

4. The station for a steam system of claim 1, further comprising:
   a bonnet with a transverse portion to mount to the face of the body and an elongate portion extending from the transverse portion, with a bore formed through;
   a handle mounted for rotation about the elongate portion, wherein the valve stem is connected to the handle and extends through the bore; and
   wherein at least one of the elongate portion and the handle includes indicia formed thereon that correspond to the four positions of the valve stem.

5. A steam tracing system comprising:
   a steam source;
   a body forming a first chamber extending between an inlet and an outlet, wherein the inlet is adapted to receive steam from the steam source, and a second chamber extending inward from a face of the body to intersect the first chamber, the body further forming a first passage extending from an intermediate region of the second chamber to a first port and a second passage extending from a distal region of the second chamber to a second port;
   a first gasket disposed in the intermediate region of the second chamber;
   a second gasket disposed in the distal region of the second chamber;
   a valve stem, mounted for translation within the second chamber between four positions to individually activate and deactivate the first port and the second port, with a central piston sized to engage the first gasket to block steam flow to the first port, and a distal piston longitudinally spaced apart from the central piston by a shaft portion and sized to engage the second gasket to block steam flow to the second port; and a heat transfer device coupled to a product line and connected to one of the first port and the second port by a tracer line to receive steam to heat product within the product line.

6. The steam tracing system of claim 5, wherein the shaft portion is formed with a radial dimension that is less than a corresponding radial dimension of at least one of the central piston and the distal piston to facilitate steam flow to the first port when arranged adjacent to the first gasket.

7. The steam tracing system of claim 5, wherein the valve stem is translatable to:
a first position in which the central piston engages the first gasket to block steam flow to the first port, and the distal piston engages the second gasket to block steam flow to the second port,
a second position in which the central piston engages the first gasket to block steam flow to the first port, and the distal piston is spaced apart from the second gasket to facilitate steam flow to the second port,
a third position in which the shaft portion is arranged adjacent to the first gasket to facilitate steam flow to the first port, and the distal piston engages the second gasket to block steam flow to the second port, and
a fourth position in which the shaft portion is arranged adjacent to the first gasket to facilitate steam flow to the first port, and the distal piston is spaced apart from the second gasket to facilitate steam flow to the second port.

8. The steam tracing system of claim 5, further comprising:
a bonnet with a transverse portion to mount to the face of the body and an elongate portion extending from the transverse portion, with a bore formed through;
a handle mounted for rotation about the elongate portion, wherein the valve stem is connected to the handle and extends through the bore; and
wherein at least one of the elongate portion and the handle includes indicia formed thereon that correspond to the four positions of the valve stem.

9. A manifold for a steam system comprising:
a body forming a first chamber extending between an inlet and an outlet along a first axis and a second chamber extending from a face of the body along a second axis to intersect the first chamber, wherein the second chamber comprises an inlet valve chamber, and wherein the body further forms an outlet valve chamber extending from a second face of the body to intersect the first chamber;
a first piston valve sub-assembly disposed in the second chamber to enable and disable steam communication between the second chamber and a first port;
a second piston valve sub-assembly disposed in the second chamber, and spaced apart from the first piston valve sub-assembly, to enable and disable steam communication between the second chamber and a second port;
a handle mounted for rotation relative to the face; and
a valve stem connected to the handle and mounted for translation within the second chamber in response to rotation of the handle between four positions to individually activate and deactivate the first piston valve sub-assembly and the second piston valve sub-assembly,
a third piston valve sub-assembly disposed in the outlet valve chamber to enable and disable steam communication between the outlet valve chamber and a third port;
a fourth piston valve sub-assembly disposed in the outlet valve chamber to enable and disable steam communication between the outlet valve chamber and a fourth port;
a second handle mounted for rotation relative to the second face; and
a second valve stem connected to the second handle and mounted for translation within the outlet valve chamber in response to rotation of the second handle between four positions to individually activate and deactivate the third piston valve sub-assembly and the fourth piston valve sub-assembly.

10. The manifold of claim 9 further comprising:
a bonnet with a transverse portion to mount to the face of the body, and an elongate portion extending from the transverse portion with a bore formed through, wherein the elongate portion includes indicia formed thereon; and
wherein the handle is mounted for rotation and translation about the elongate portion and adapted to cover the indicia during translation such that uncovered portion of the indicia is indicative of a current position of the valve stem.

11. The manifold of claim 9, wherein the valve stem further comprises:
a proximal end connected to the handle;
a central piston extending from the proximal end; and
a distal piston longitudinally spaced apart from the central piston by a shaft portion.

12. The manifold of claim 11, wherein the first piston valve sub-assembly further comprises a first gasket disposed in an intermediate region of the second chamber, and wherein the central piston is sized to engage the first gasket to block steam flow to the first port.

13. The manifold of claim 12, wherein the shaft portion comprises a second shaft portion, the manifold further comprising:
an intermediate piston longitudinally spaced apart from the central piston by a first shaft portion, wherein at least one of the central piston and the intermediate piston are sized to engage the first gasket to block steam flow to the first port; and
wherein at least one of the first shaft portion and the second shaft portion is formed with a radial dimension that is less than a corresponding radial dimension of at least one of the central piston, the intermediate piston, and the distal piston to facilitate steam flow to the first port when arranged adjacent to the first gasket.

14. The manifold of claim 11, wherein the second piston valve sub-assembly further comprises a second gasket disposed in a distal region of the second chamber, and wherein the distal piston is sized to engage the second gasket to block steam flow to the second port.

15. A station for a steam system comprising:
a manifold according to claim 9, wherein the inlet is adapted to receive a mixture of steam and condensate; and
a steam trap coupled between the second port and the fourth port to separate condensate from the mixture of steam and condensate.

16. A steam tracing system comprising:
a steam source;

a manifold according to claim 9, wherein the inlet is adapted to receive steam from the steam source;

a first heat transfer device coupled to a first product line and connected to the first port by a first tracer line to receive steam to heat product within the first product line; and a second heat transfer device coupled to a second product line and connected to the second port by a second tracer line to receive steam to heat product within the second product line.

* * * * *